(12) United States Patent
Itou et al.

(10) Patent No.: US 9,690,131 B2
(45) Date of Patent: Jun. 27, 2017

(54) LIQUID CRYSTAL DISPLAY DEVICE

(71) Applicant: Japan Display Inc., Tokyo (JP)

(72) Inventors: Osamu Itou, Tokyo (JP); Kenji Nakao, Tokyo (JP); Toshimasa Ishigaki, Tokyo (JP); Masahiro Kosuge, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/967,868

(22) Filed: Dec. 14, 2015

(65) Prior Publication Data

US 2016/0170259 A1    Jun. 16, 2016

(30) Foreign Application Priority Data

Dec. 15, 2014  (JP) .................................. 2014-253260

(51) Int. Cl.
*G02F 1/1335*   (2006.01)
*G02F 1/1362*   (2006.01)

(52) U.S. Cl.
CPC .. *G02F 1/133502* (2013.01); *G02F 1/136286* (2013.01)

(58) Field of Classification Search
CPC .............. G02F 1/133502; G02F 1/136286
See application file for complete search history.

(56) References Cited

U.S. PATENT DOCUMENTS

2014/0104527 A1* 4/2014 Yang ................... H01L 27/1225
349/43

FOREIGN PATENT DOCUMENTS

JP          2002-350886 A    12/2002

* cited by examiner

*Primary Examiner* — James Dudek
(74) *Attorney, Agent, or Firm* — Typha IP LLC

(57) ABSTRACT

The elution of a color filter to a liquid crystal layer is reduced. A liquid crystal display device includes an active device substrate, a liquid crystal layer provided on the active device substrate, and a counter substrate provided on the liquid crystal layer. The active device substrate includes an active device, a common electrode, a common interconnection electrically connected to the common electrode, a reflection reduction film provided on the common interconnection, a first insulating layer provided on the reflection reduction film, and a pixel electrode having a flat portion provided on the first insulating layer and a first projecting portion protruding downwardly. The first the projecting portion is electrically connected to the active device.

15 Claims, 24 Drawing Sheets

FIG. 5
FIG. 6
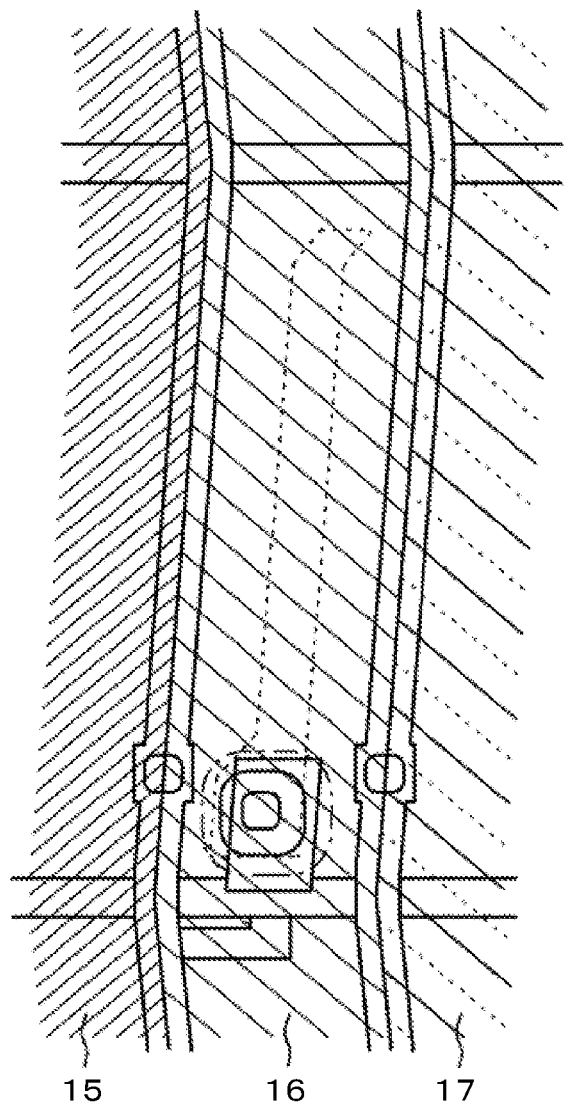
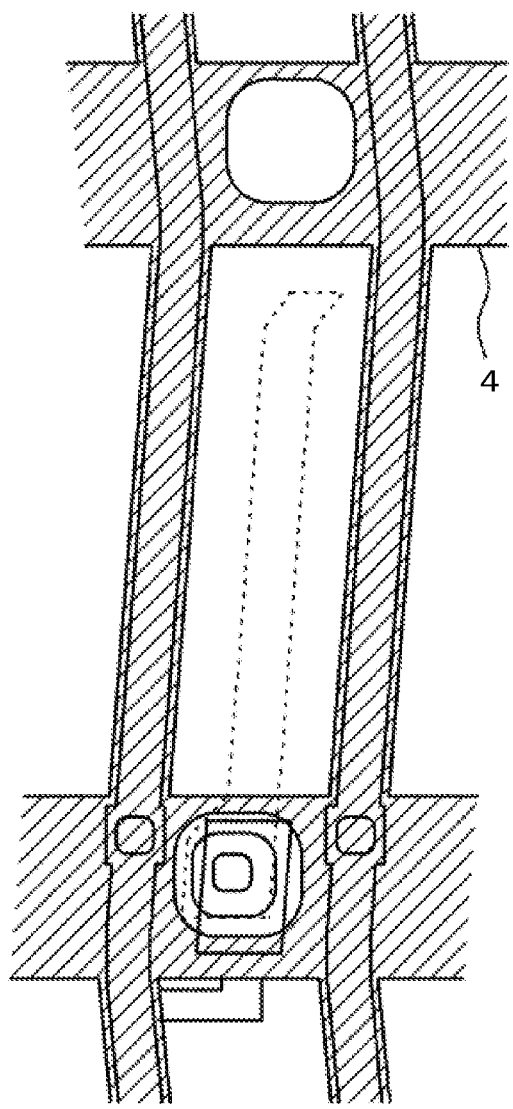
15  16  17
4

(a)

(b)

(c)

LIQUID CRYSTAL DISPLAY DEVICE

CLAIM OF PRIORITY

The present application claims priority from Japanese Patent Application JP 2014-253260 filed on Dec. 15, 2014, the content of which is hereby incorporated by reference into this application.

BACKGROUND OF THE INVENTION (1) Field of the Invention

The present invention relates to a liquid crystal display device, and more specifically to a liquid crystal display device in which a color filter and an active device are disposed on the same substrate.

(2) Description of the Related Art

A liquid crystal display device includes an upper substrate provided with a color filter and a black matrix and a lower substrate provided with an interconnection and an active device, and a liquid crystal is provided between the upper and lower substrates. In such a liquid crystal display device, it is extremely difficult to align the color filter with the active device, easily causing a decrease in color mixture and a decrease in the aperture ratio. In order to solve such problems, a color filter on array (COA) technology is used in which a color filter and an active device are formed on the same substrate.

Japanese Unexamined Patent Application Publication No. 2002-350886 describes a display device in which on one of substrates, a color filter is provided on a protective film for an active device, a contact hole is formed on the color filter and the protective film for the active device, and then the pixel electrodes of the active devices are connected to each other.

SUMMARY OF THE INVENTION

On the other hand, in a liquid crystal display device, a common electrode is provided on an active device substrate provided with an active device. In order to make the potential of the common electrode constant, a common interconnection having a resistance lower than the resistance of the common electrode is sometimes provided.

In the case of plane switching (IPS) liquid crystal display devices including fringe field switching (FFS) liquid crystal display devices, a common electrode and a common interconnection are provided on an active device substrate proved with an active device. In COA liquid crystal display devices, a common electrode and a common interconnection are provided above a color filter. In the case in which natural light from above is reflected at the common interconnection in particular, a problem arises in that the contrast ratio of the liquid crystal display device is reduced.

It is an object of the present invention to solve such problems, and to provide a liquid crystal display device having a reflection reduction film provided on a common interconnection.

A liquid crystal display device according to an aspect of the present invention is a liquid crystal display device including a first substrate, a liquid crystal layer provided on the first substrate, and a second substrate provided on the liquid crystal layer. In the liquid crystal display device, the first substrate includes a color filter, a common electrode provided on the color filter, a common interconnection electrically connected to the common electrode, a reflection reduction film provided on the common interconnection and on the color filter, a pixel electrode that produces an electric field across the common electrode and the pixel electrode, and a first insulating layer provided between the common electrode and the pixel electrode.

According to an aspect of the present invention, the reflection reduction film is provided on the common interconnection, and thus a decrease in the contrast ratio can be reduced even under natural light.

BRIEF DESCRIPTION OF THE DRAWINGS

FIG. 5 is a plan view of the active device substrate according to the first embodiment;

FIG. 6 is a plan view of the active device substrate according to the first embodiment;

DETAILED DESCRIPTION OF THE PREFERRED EMBODIMENTS

First Embodiment

Figure 1:
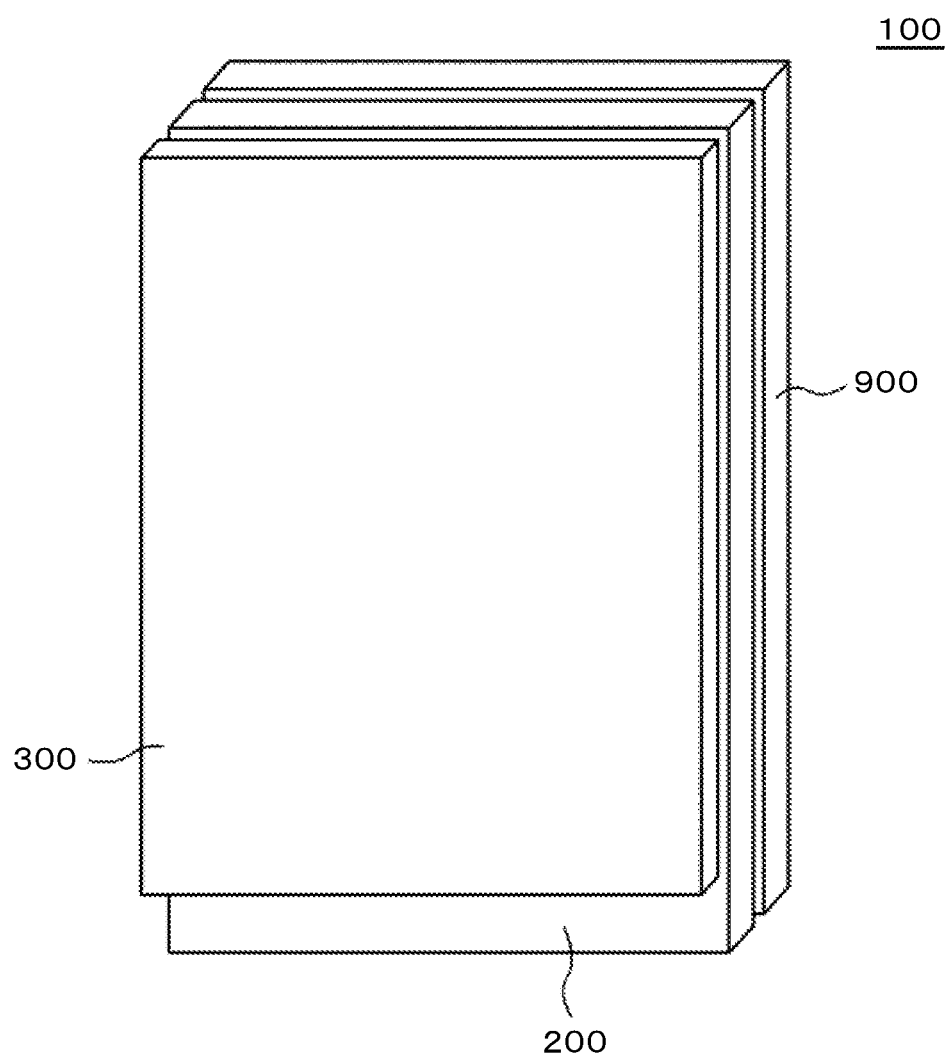
FIG. 1 is a perspective view of a liquid crystal display device according to a first embodiment.

A first embodiment will be described. FIG. 1 is a perspective view of a liquid crystal display device 100 according to the first embodiment. The liquid crystal display device 100 includes an active device substrate 200 that is a first substrate, a counter substrate 300 that is a second substrate, and a backlight unit 900.

The backlight unit 900 has a light emitting unit, such as a light emitting diode (LED), and emits light from the outer side of the active device substrate 200 so that the light transmits the active device substrate 200 and the counter substrate 300.

Figure 2:
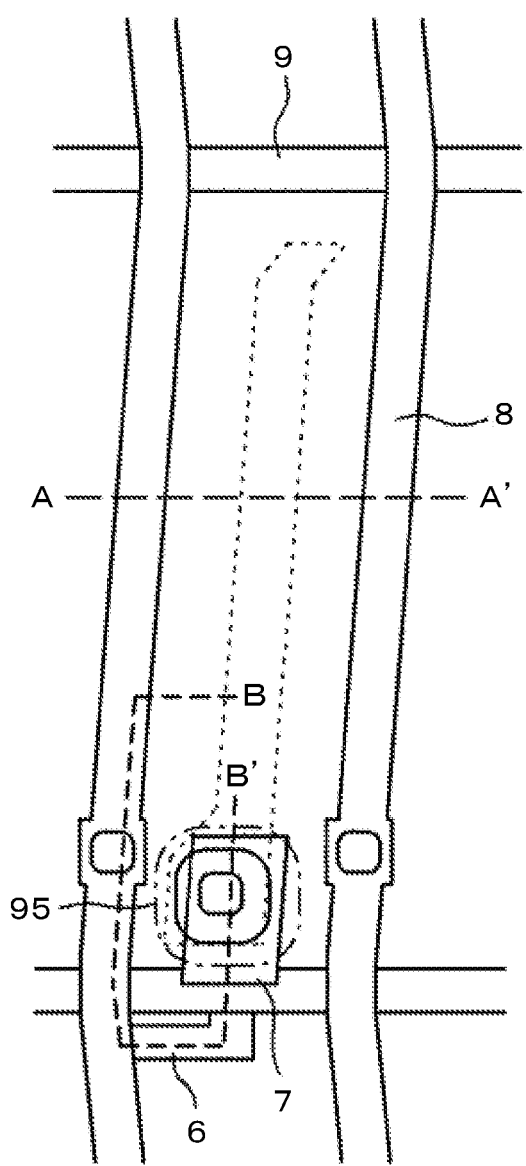
FIG. 2 is a plan view of an active device substrate according to the first embodiment.
Figure 3:
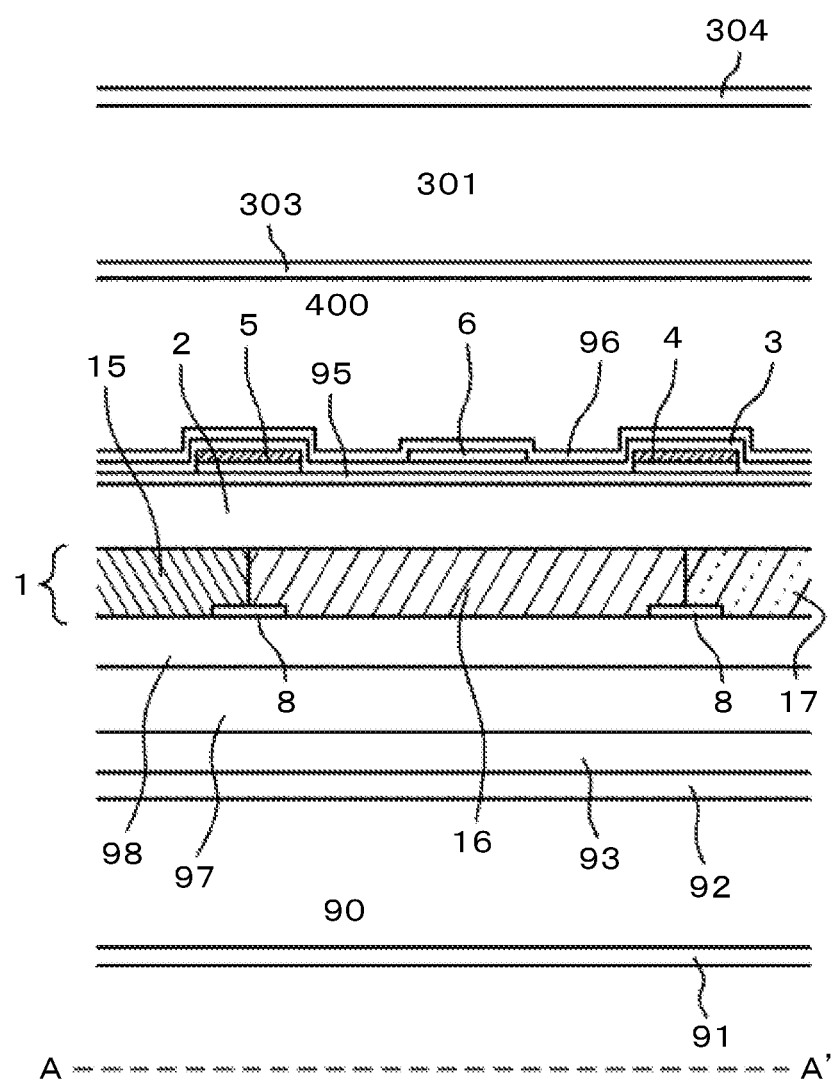
FIG. 3 is a cross sectional view of the liquid crystal display device according to the first embodiment.
Figure 4:
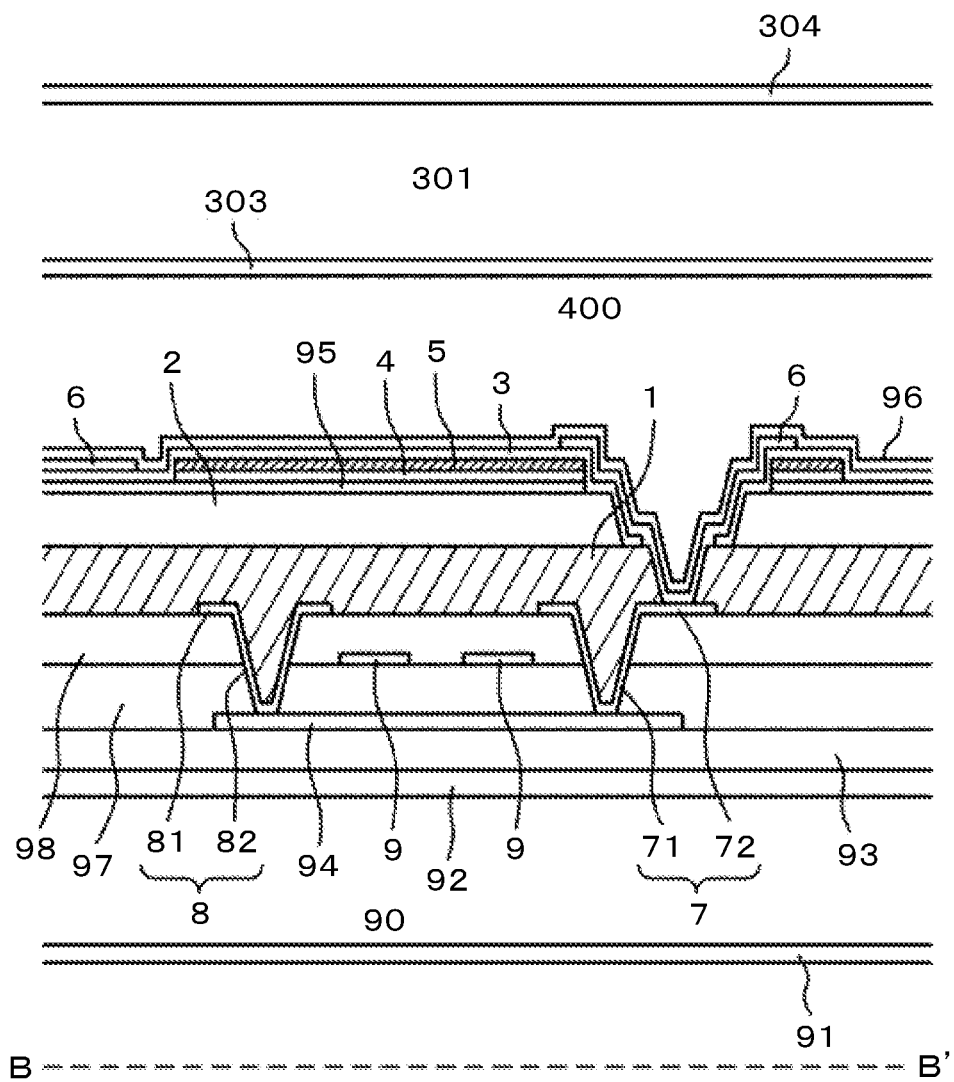
FIG. 4 is a cross sectional view of the liquid crystal display device according to the first embodiment.

FIG. 2 is a plan view of the active device substrate 200 according to the first embodiment. FIG. 3 is a cross sectional view of the liquid crystal display device 100 according to the first embodiment taken along line A-A' in FIG. 2. FIG. 4 is a cross sectional view of the liquid crystal display device 100 according to the first embodiment taken along line B-B' in FIG. 2.

The liquid crystal display device 100 includes the active device substrate 200, the counter substrate 300 disposed above the active device substrate 200 and opposed to the active device substrate 200, and a liquid crystal layer 400 provided between the active device substrate 200 and the counter substrate 300. In the first embodiment and other embodiments, a direction from the counter substrate 300 to the active device substrate 200 is referred to as a downward direction, and a direction from the active device substrate 200 to the counter substrate 300 is referred to as an upward direction. In FIG. 3, the backlight unit 900 is provided below the active device substrate 200.

The active device substrate 200 includes a color filter 1, a second insulating layer 2, a first insulating layer 3, a common interconnection 4, a reflection reduction film 5, an insulating layer 97, an insulating layer 98, a pixel electrode 6, a relay electrode 7, a picture signal line 8 that is a signal line, a scanning signal line 9 that is a signal line, a transparent substrate 90, a second polarizer 91, an undercoat film 92, an undercoat film 93, a semiconductor layer 94, a common electrode 95, and a first alignment film 96. A hole that is a first hole is formed on the color filter 1. A hole that is a second hole is formed on the second insulating layer 2.

The transparent substrate 90 is a flat plate. Although the transparent substrate 90 is made of glass, the transparent substrate 90 may be made of plastic, for example. The second polarizer 91 is provided below the transparent substrate 90.

The undercoat film 92 is provided on the transparent substrate 90. The undercoat film 92 is made of an insulator material, such as silicon nitride.

The undercoat film 93 is provided on the undercoat film 92. The undercoat film 93 is made of an insulator material, such as silicon oxide. The undercoat film 92 and the undercoat film 93 prevent an alkaline component, such as sodium ions, from being eluted out of the transparent substrate 90.

The semiconductor layer 94 is in a bent strip in a planar view. The semiconductor layer 94 is provided on a part of the undercoat film 93. The semiconductor layer 94 is made of polysilicon. The semiconductor layer 94 may be made of amorphous silicon, for example, or may be made of an oxide semiconductor containing indium, gallium, zinc, or other elements.

The insulating layer 97 is in a flat plate shape. The insulating layer 97 is provided on the undercoat film 93 where the semiconductor layer 94 is not provided and on the semiconductor layer 94. The insulating layer 97 is made of silicon nitride, for example. On the insulating layer 97, two holes are formed for one subpixel. The holes formed on the insulating layer 97 vertically penetrate to a part of the semiconductor layer 94, and the holes are tapered downwardly.

The scanning signal line 9 is in a strip in a planar view. The scanning signal line 9 is provided on the insulating layer 97 on the boundary of the subpixels. The scanning signal lines 9 are provided in parallel with each other. The scanning signal line 9 may be formed linearly, or a part of the scanning signal line 9 may be bent.

A part of the scanning signal line 9 is a part of the active device of pixels, and another part is connected to the active device. This case includes the case in which the scanning signal line 9 is electrically connected to the electrode configuring the active device. The scanning signal line 9 is connected to a scanning circuit provided on the active device substrate 200 to carry scanning signals inputted from the scanning circuit. The scanning signal controls turning on or off the active device. In the case in which the active device, described later, is turned on, the voltage value of the scanning signal is at a gate high voltage higher than the potential of the common electrode 95, described later, whereas in the case in which the active device is tuned off, the voltage value of the scanning signal is at a gate low voltage lower than the potential of the common electrode 95. The scanning signal line 9 is made of a metal, such as a molybdenum tungsten alloy. The scanning signal line 9 may be made of a titanium aluminum alloy.

The insulating layer 98 is in a flat plate shape. The insulating layer 98 is provided on the insulating layer 97 where the scanning signal line 9 is not provided and on the scanning signal line 9. The insulating layer 98 is made of silicon nitride, for example.

On the insulating layer 98, two holes are formed for one subpixel. The holes vertically penetrate through the insulating layer 98, and the holes are tapered downwardly. The two holes formed on the insulating layer 98 are formed on the upper side of the two holes formed on the insulating layer 97. The holes formed on the insulating layer 98 vertically penetrate to a part of the semiconductor layer 94, and the holes are tapered downwardly. The lower end shape of the two holes formed on the insulating layer 98 may be the same as the top end shape of the two holes formed on the insulating layer 97.

The relay electrode 7 has a flat portion 72 and a projecting portion 71. The flat portion 72 is provided on the insulating layer 98. The flat portion 72 is in a plate shape having a width smaller than the gap between the scanning signal lines 9 and the gap between the picture signal lines 8 along the boundaries of the subpixels. The flat portion 72 is rectangular in a planar view, for example. The relay electrode 7 is made of a metal, such as a titanium aluminum alloy.

The projecting portion 71 is provided near the center of the flat portion 72 continuously to the flat portion 72. The projecting portion 71 is in a cone shape or a circular truncated cone shape, for example, projecting downwardly. The inside of the projecting portion 71 is filled with the color filter 1, and the projecting portion 71 is tapered downwardly. The side surface of the projecting portion 71 is provided along the hole on the insulating layer 98 and the hole on the insulating layer 97, and the lower end is in contact with the top face of the semiconductor layer 94.

The picture signal line 8 is connected to a thin film transistor (TFT). The TFT is an active device, described later, provided on each pixel. The picture signal line 8 applies a picture signal to the active device in the on state, and then a voltage is applied to the liquid crystal layer 400, described later. The picture signal line 8 is connected to a picture signal circuit provided on the active device substrate 200. The picture signal line 8 carries a picture signal inputted from the picture signal circuit. The picture signal line 8 is made of a metal, such as a titanium aluminum alloy. The picture signal line 8 may be made of a molybdenum tungsten alloy.

The picture signal line 8 has a line portion 81 and a projecting portion 82, and is in a line shape in a planar view. The line portion 81 is provided on the insulating layer 98. In a planar view, the line portion 81 is provided along the direction perpendicular to the scanning signal line 9. In a planar view, the line portion 81 is in a nearly straight line shape having a straight portion and a bent portion bent at a place at which the line portion 81 crosses the scanning signal line 9. The bent portions are adjacent to each other in the direction along the scanning signal line 9, and bent in the same direction. On the other hand, the bent portions are adjacent to each other in the direction perpendicular to the scanning signal line 9, and bent in the opposite directions. The scanning signal line 9 may be in a straight line shape perpendicular to the picture signal line 8.

On the line portion 81, the projecting portion 82 is provided near the relay electrode 7. The projecting portion 82 is in a cone shape or a circular truncated cone shape, for example, projecting downwardly. The inside of the projecting portion 82 is filled with the color filter 1, and the projecting portion 82 is tapered downwardly. The side surface of the projecting portion 82 is provided along the hole on the insulating layer 98 and the hole on the insulating layer 97, and the lower end is in contact with the top face of the semiconductor layer 94.

As described above, the flat portion 72 of the relay electrode 7 and the line portion 81 of the picture signal line 8 are provided on the same layer. The projecting portion 71 of the relay electrode 7 and the projecting portion 82 of the picture signal line 8 are in contact with the same semiconductor layer 94.

FIG. 5 is a plan view of the active device substrate 200 according to the first embodiment, schematically illustrating the color filter 1.

The color filter 1 is provided on the relay electrode 7, on the picture signal line 8, and on the insulating layer 98 where the relay electrode 7 or the picture signal line 8 is not provided. The color filter 1 is made of an insulator, which is a negative organic photoresist containing pigment particles. The thickness of the color filter 1 ranges from one to three micrometers, for example.

The color filter 1 includes a red color filter 15, a green color filter 16, and a blue color filter 17. Any one of the red color filter 15, the green color filter 16, and the blue color filter 17 is provided for each subpixel. The red color filter 15, the green color filter 16, and the blue color filter 17 are arranged so that these colors are cyclically repeated in the direction along the scanning signal line 9.

One pixel includes a subpixel with one red color filter 15, a subpixel with one green color filter 16, and one subpixel with the blue color filter 17. The pixels are arranged in the directions along the picture signal line 8 and the scanning signal line 9. The picture signal line 8 is provided along the boundaries of the red color filter 15, the green color filter 16, and the blue color filter 17.

The red color filter 15, the green color filter 16, and the blue color filter 17 are in a rectangle in the same size, for example. However, any sizes and any shapes are possible. The color filter 1 may be a filter in another color. The color filter 1 is also provided inside the projecting portion 71 and the projecting portion 82.

A hole is formed on the color filter 1. The hole on the color filter 1 is formed above the flat portion 72. The hole vertically penetrates through the color filter 1, and the hole is tapered downwardly. For example, the hole on the color filter 1 is circular on the top end at a diameter of about four micrometers, and circular on the lower end at a diameter of about two micrometers.

The second insulating layer 2 is provided on the color filter 1. The second insulating layer 2 is made of a positive organic photoresist, for example. The thickness of the second insulating layer 2 ranges from one to two micrometers, for example. A hole is formed on the second insulating layer 2 on the upper side of the hole on the color filter 1. The hole vertically penetrates through the second insulating layer, and the hole is tapered downwardly. For example, the hole on the second insulating layer 2 is circular on the top end at a diameter of about eight micrometers, and circular on the lower end at a diameter of about six micrometers.

The common electrode 95 is provided on the second insulating layer 2. The common electrode 95 is in a plate shape across the entire region of the subpixels. The common electrode 95 may be in a strip extending in the same direction or nearly in the same direction as the pixel electrode 6, described later. The common electrode 95 is made of a transparent, conductive material, such as indium tin oxide (ITO), indium zinc oxide (IZO), and indium gallium oxide (IGO). The common electrode 95 is connected to the scanning circuit, for example, through an interconnection. The voltage value of the common electrode 95 may be kept constant. However, the voltage value may be varied with scan periods in order to reduce flickers, for example.

A hole is formed on the common electrode 95. The hole on the common electrode 95 is greater than the top end diameter of the hole formed on the second insulating layer 2. The rim of the hole on the common electrode 95 and the rim of the hole on the second insulating layer 2 form steps.

FIG. 6 is a plan view of the active device substrate 200 according to the first embodiment, schematically illustrating the common interconnection 4.

The common interconnection 4 is provided on the common electrode 95. The common interconnection 4 is electrically connected to the common electrode 95, and desirably provided directly on the common electrode 95. The common interconnection 4 is made of a chromium molybdenum alloy, for example. In addition to this, the common interconnection 4 only has to be made of a material whose resistance is lower than the resistance of the common electrode 95, and may be made of an aluminum silicon alloy.

The common interconnection 4 is provided along the picture signal line 8 and the scanning signal line 9. The common interconnection 4 along the picture signal line 8 has a width wider than the width of the picture signal line 8, and desirably covers the entire picture signal line 8 in a planar view.

The common interconnection 4 provided along the scanning signal line 9 has a width wider than the width of the scanning signal line 9, and desirably covers the entire scanning signal line 9 in a planar view. The width of the common interconnection 4 is wider than the diameter of the hole on the second insulating layer 2. A hole is provided on the common interconnection 4. The hole is concentrically provided on the hole on the second insulating layer 2 and greater than the top end diameter of the hole on the second insulating layer 2.

In the case in which the common electrode 95 is made of ITO, the ITO common electrode 95 has a resistance higher than the resistance of the common electrode 95 made of a metal. More specifically, in the case in which the voltage value of the common electrode 95 fluctuates, the voltage value is sometimes fluctuates with delay. The common interconnection 4 has a resistance value lower than the resistance value of the common electrode 95. Thus, the common interconnection 4 can promptly transmit signals, and can reduce the delay on the voltage value.

Figure 7:
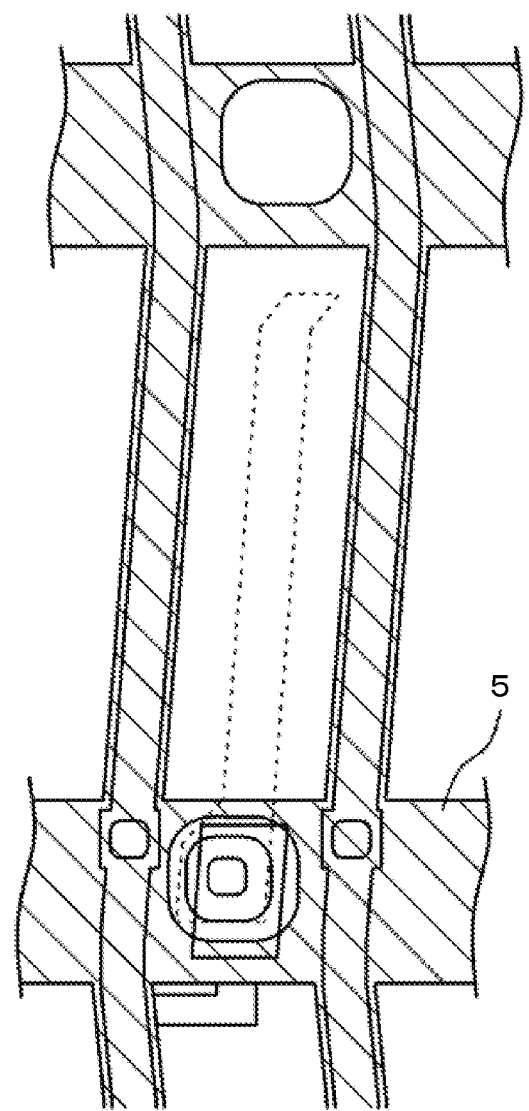
FIG. 7 is a plan view of the active device substrate according to the first embodiment.

FIG. 7 is a plan view of the active device substrate 200 according to the first embodiment, schematically illustrating the reflection reduction film 5.

The reflection reduction film 5 is provided on the common interconnection 4. The reflection reduction film 5 has the same shape as the shape of the common interconnection 4 in a planar view. The reflection reduction film 5 may have a width wider than the width of the common interconnection 4 in a planar view.

The reflection reduction film 5 is made of a non-photosensitive organic high molecule film containing black particles, for example. The thickness of the reflection reduction film 5 is 0.5 micrometers. In order to combine reducing a decrease in the contrast ratio with reducing the thickness, the reflection reduction film 5 desirably has a value of optical density (OD) ranging from 0.5 to 1.0.

In addition to this, the reflection reduction film 5 may be made of a titanium nitride, for example. In this case, the thickness of the reflection reduction film 5 ranges from 120 to 140 nm.

The reflection reduction film 5 may be a multi-layer film using an interference effect. In this case, the reflection reduction film 5 has a configuration in which a first low refractive index layer, a high refractive index layer, and a second low refractive index layer are stacked from the layer close to the common interconnection 4, for example. In this case, for example, the first low refractive index layer and the second low refractive index layer are made of an indium oxidize material, such as ITO, IZO, and IGO, and the high refractive index layer is made of a molybdenum niobium alloy.

Natural light is entered from the upper side to the active device substrate 200, passed through the reflection reduction film 5, reflected at the common interconnection 4, and then again passed through the reflection reduction film 5. As described above, light is passed through the reflection reduction film 5 twice. Thus, the reflectance of the stacked product formed of the common interconnection 4 and the reflection reduction film 5 is $T^2R$, where the transmittance of the reflection reduction film 5 is defined as T, and the reflectance of the common interconnection 4 is defined as R. For example, in the case in which the transmittance of the reflection reduction film 5 is set to 10% and the reflectance of the common interconnection 4 is set to 20%, the reflectance of the stacked product formed of the reflection reduction film 5 and the common interconnection 4 is 0.2%. As described above, the liquid crystal display device 100 according to the embodiment can reduce the reflection of natural light, and thus can reduce a decrease in the contrast ratio.

The first insulating layer 3 is made of an inorganic insulator, such as a silicon nitride film, in a thickness of 120 to 200 nm. The first insulating layer 3 has a flat portion 31 and a projecting portion 32. The flat portion 31 is provided on the reflection reduction film 5 and on the common electrode 95 where the reflection reduction film 5 is not provided above the common electrode 95. The projecting portion 32 is provided along the side surface of the hole on the common electrode 95, the top face and the side surface on the rim of the hole on the second insulating layer 2, and the top face on the rim of the hole on the color filter 1. Thus, the lower end of the projecting portion 32 is provided on the color filter 1. The projecting portion 32 is nearly in a circular truncated cone shape.

In the case in which the reflection reduction film 5 is made of a chromium molybdenum alloy, this reflection reduction film 5 sometimes contains charged impurities. In this case, charged impurities migrate into the liquid crystal layer 400, and reduce the resistance of the liquid crystal layer 400 near the impurities. This sometimes causes problems, such as flickers and afterglow. However, the first insulating layer 3 is provided between the reflection reduction film 5 and the liquid crystal layer 400. Thus, the migration of impurities can be prevented.

The pixel electrode 6 is provided for each subpixel, having a strip portion 61 and a projecting portion 62. The strip portion 61 is provided along each picture signal line 8, and the strip portion 61 is in a strip slightly shorter than the gap between the scanning signal lines 9. The pixel electrode 6 is made of a transparent, conductive material, such as ITO, and has a thickness of 50 nm. Any shapes are possible for the shape of the pixel electrode 6. A plurality of strip electrodes may be spaced for each subpixel.

The pixel electrode 6 and the common electrode 95 produce a fringing field across the pixel electrode 6 and the common electrode 95. The fringing field controls the alignment of the liquid crystal layer 400. A portion where the pixel electrode 6, the first insulating layer 3, and the common electrode 95 are laid on one another functions as a capacitor, and the portion holds electric charges for a time period for which no voltage is applied.

The projecting portion 62 is provided continuously to the strip portion 61. The projecting portion 62 is provided along the inner side surface of the projecting portion 32 and along the rim of the hole on the color filter 1 to form steps. In other words, the projecting portion 32 of the first insulating layer 3 covers the side surface of the projecting portion 62 from the outer side.

The projecting portion 62 protrudes downwardly below the projecting portion 32 of the first insulating layer 3, and the lower end contacts the top face of the relay electrode 7. Thus, the pixel electrode 6 is electrically connected to the relay electrode 7. A conductive material may be provided between the projecting portion 62 and the relay electrode 7 for electrically connecting the projecting portion 62 to the relay electrode 7.

The insulating layer 97, the relay electrode 7, the semiconductor layer 94, and the picture signal line 8 and the scanning signal line 9 provided near these elements function as active devices. The active devices are controlled to turn on or off by a voltage applied to the scanning signal line 9. Instead of the relay electrode 7, the picture signal line 8, or the scanning signal line 9, an electrode electrically connected to the relay electrode 7, the picture signal line 8, or the scanning signal line 9 may function as an active device. After turned on, the active device carries a potential corresponding to a picture signal inputted from the picture signal line 8 to the relay electrode 7 and the pixel electrode 6 through the semiconductor layer 94. The pixel electrode 6 applies a potential corresponding to the picture signal to the liquid crystal layer 400.

The first alignment film 96 is made of a polyimide, for example, for aligning the liquid crystal molecule group of the liquid crystal layer 400 in a certain direction. The first alignment film 96 is provided on the first insulating layer 3 where the pixel electrode 6 is not provided and on the pixel electrode 6.

In the hole formed on the color filter 1, the pixel electrode 6 having the lower end in contact with the relay electrode 7 and the first alignment film 96 in contact with the inner side of the pixel electrode 6 are provided. Therefore, the first alignment film 96 is nearly in a cone shape, and the inside of the first alignment film 96 is filled with the liquid crystal layer 400.

On the hole formed on the second insulating layer 2, the projecting portion 31 of the first insulating layer 3, the projecting portion 62 of the pixel electrode 6 in contact with the inner side of the projecting portion 31, and the first alignment film 96 in contact with the inner side of the projecting portion 62 are provided from the side surface to the inner side of the hole. The inside of the first alignment film 96 is filled with the liquid crystal layer 400. The projecting portion 32 of the first insulating layer 3 covers the projecting portion 62 of the pixel electrode 6.

The liquid crystal layer 400 has positive dielectric anisotropy in which the dielectric constant in the alignment direction is greater than the dielectric constant in the vertical direction, and exhibits a nematic phase in a wide temperature range including ambient temperature. In the case in which no voltage is applied to the liquid crystal layer 400, liquid crystal molecules are in homogeneous alignment. The pixel electrode 6 applies a voltage to the liquid crystal layer 400, and then the orientation of the liquid crystal molecules in the liquid crystal layer 400 is rotated in the lateral direction.

The counter substrate 300 includes a transparent substrate 301, a second alignment film 303, and a second polarizer 304.

The transparent substrate 301 is a flat plate, for example. The second alignment film 303 is provided below the counter substrate 300. An overcoat film may be provided on the second alignment film 303.

The second polarizer 304 is provided on the transparent substrate 301. The absorption axis of the second polarizer 304 is set orthogonal to the absorption axis of the first polarizer 91 in a planar view. For example, the absorption axis of the first polarizer 91 is in parallel with the alignment direction of the liquid crystal layer 400.

According to the embodiment, the reflection reduction film 5 is provided on the common interconnection 4. Thus, reflected light, which is natural light reflected at the picture signal line 8 or the scanning signal line 9, can be reduced.

Moreover, the common interconnection 4 is in contact with the reflection reduction film 5. Thus, light entered from above as well as light obliquely entered can be blocked, and the reflected light of natural light, which is entered in a wide angle, can be reduced.

Second Embodiment

A second embodiment will be described. In the embodiment, the reflection reduction film 5 is provided below the common electrode 95.

Figure 8:
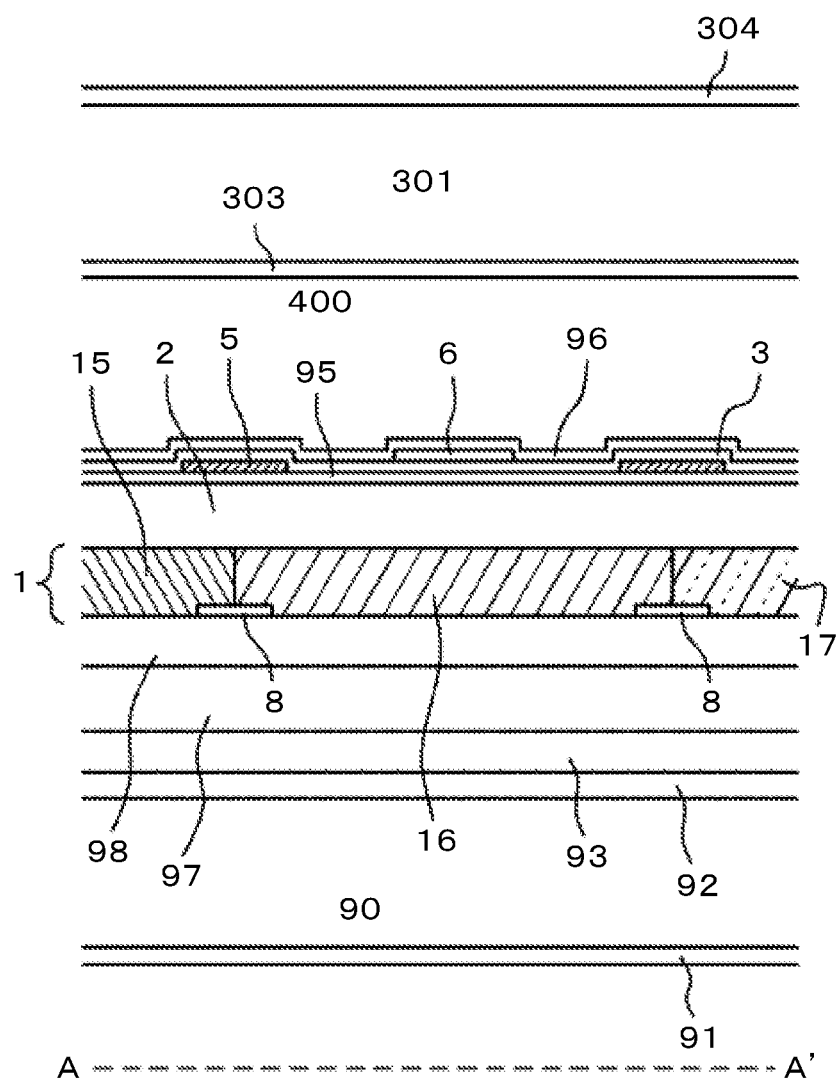
FIG. 8 is a cross sectional view of a liquid crystal display device according to a second embodiment.
Figure 9:
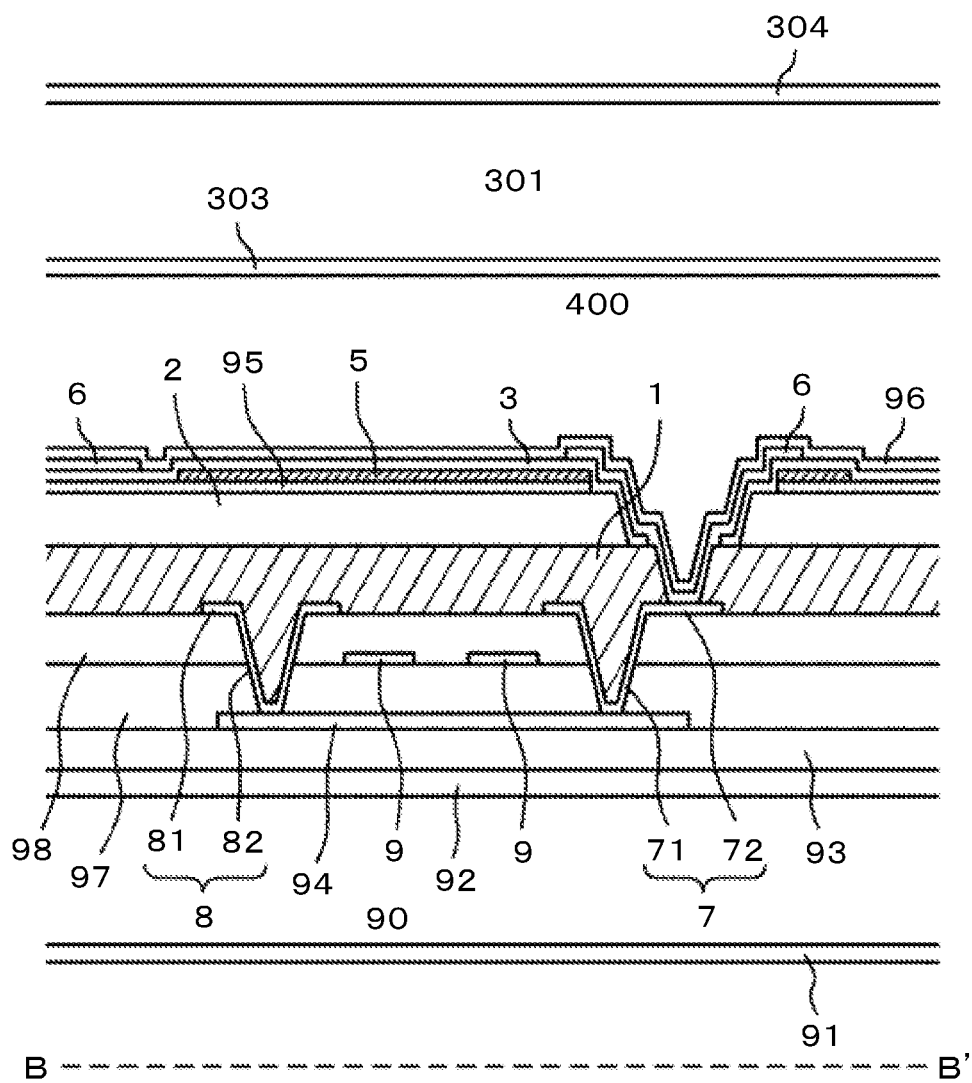
FIG. 9 is a cross sectional view of the liquid crystal display device according to the second embodiment.

FIG. 8 is a cross sectional view of a liquid crystal display device 100 according to the second embodiment, corresponding to FIG. 3. FIG. 9 is a cross sectional view of the liquid crystal display device 100 according to the second embodiment, corresponding to FIG. 4. In the following, the description of configurations similar to the configurations of the first embodiment is omitted.

The reflection reduction film 5 is in the shape similar to the shape in the first embodiment, and provided directly on the common electrode 95.

Third Embodiment

A third embodiment will be described. In the embodiment, the reflection reduction film 5 is provided on the common electrode 95, and the common interconnection 4 is provided below the common electrode 95.

Figure 10:
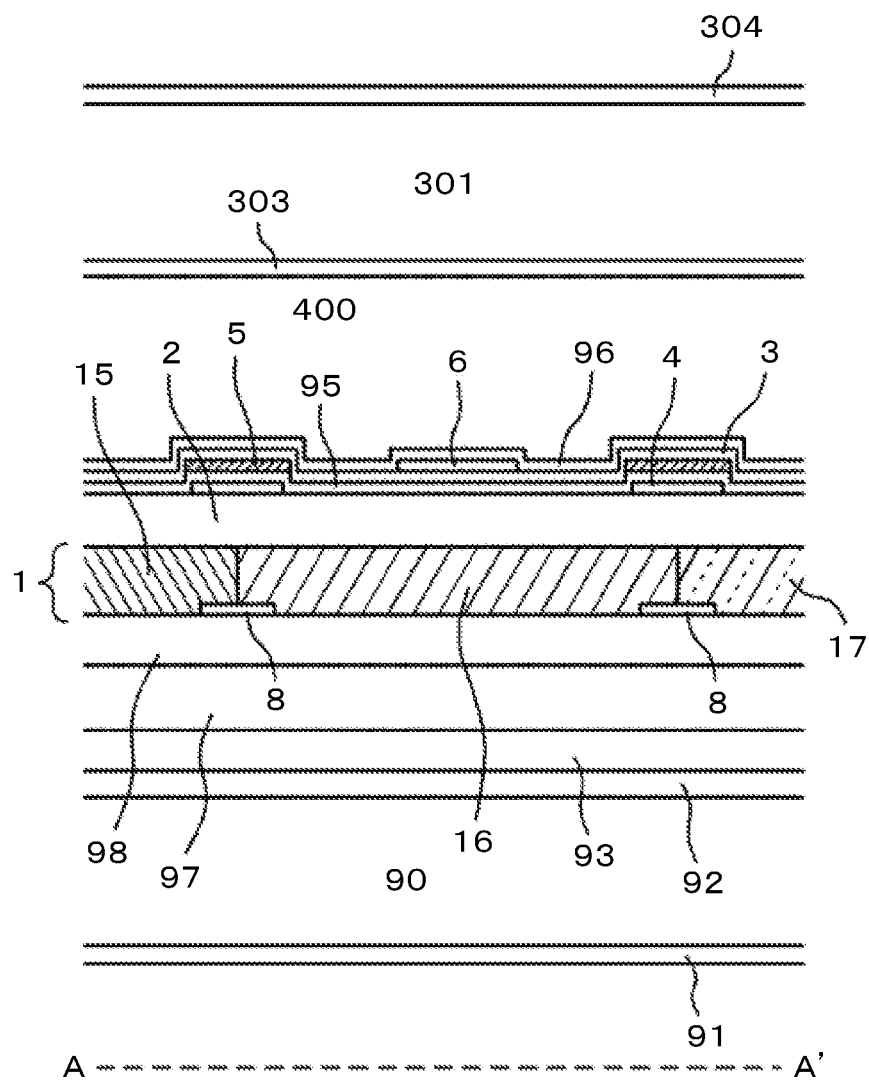
FIG. 10 is a cross sectional view of a liquid crystal display device according to a third embodiment
Figure 11:
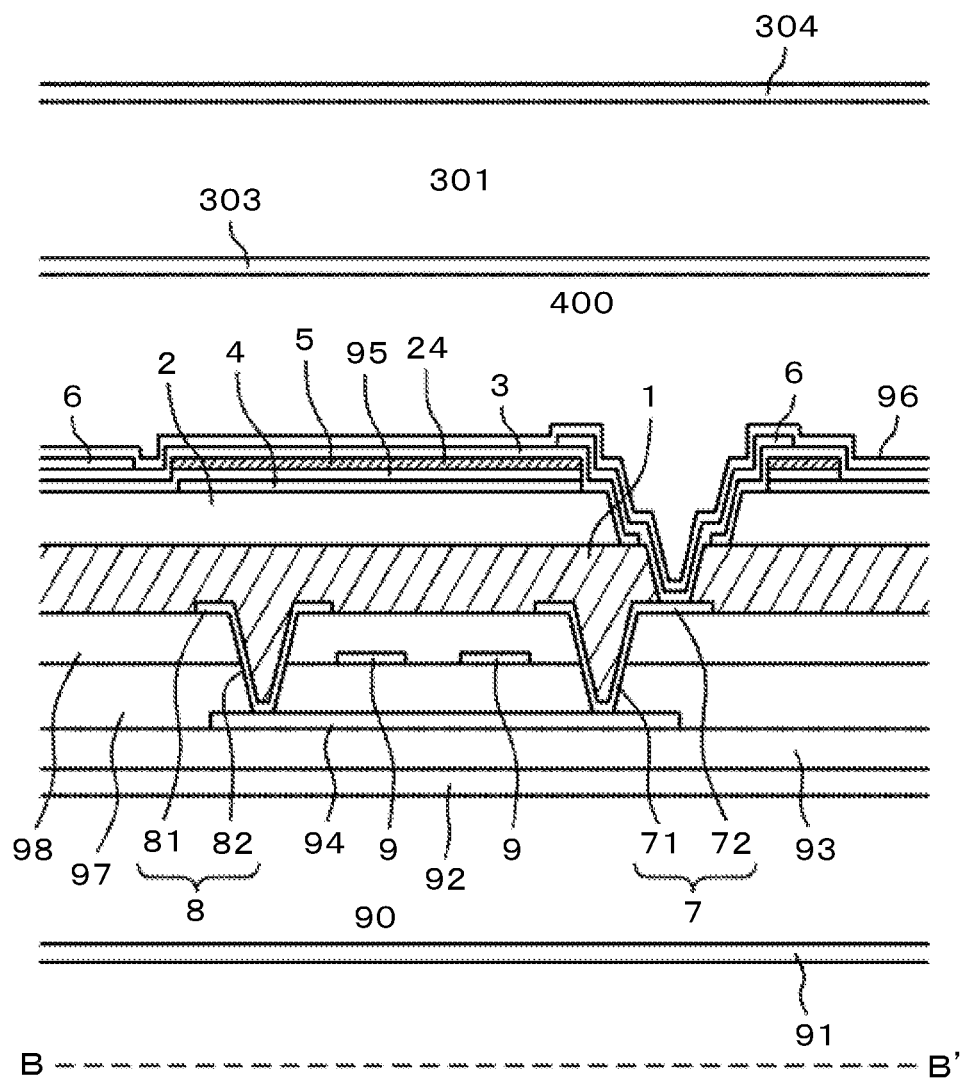
FIG. 11 is across sectional view of the liquid crystal display device according to the third embodiment.

FIG. 10 is a cross sectional view of a liquid crystal display device 100 according to the third embodiment. FIG. 11 is a cross sectional view of the liquid crystal display device 100 according to the third embodiment.

The common interconnection 4 is provided directly below the common electrode 95, and electrically connected to the common electrode 95. On the other hand, the reflection reduction film 5 is provided directly on the common electrode 95. The reflection reduction film 5 according to the embodiment is desirably made of a non-photosensitive organic high molecule film containing black particles.

Fourth Embodiment

A fourth embodiment will be described. In the embodiment, the common electrode 95 is in contact with the reflection reduction film 5, and the common interconnection 4 is electrically connected to the common electrode 95.

Figure 12:
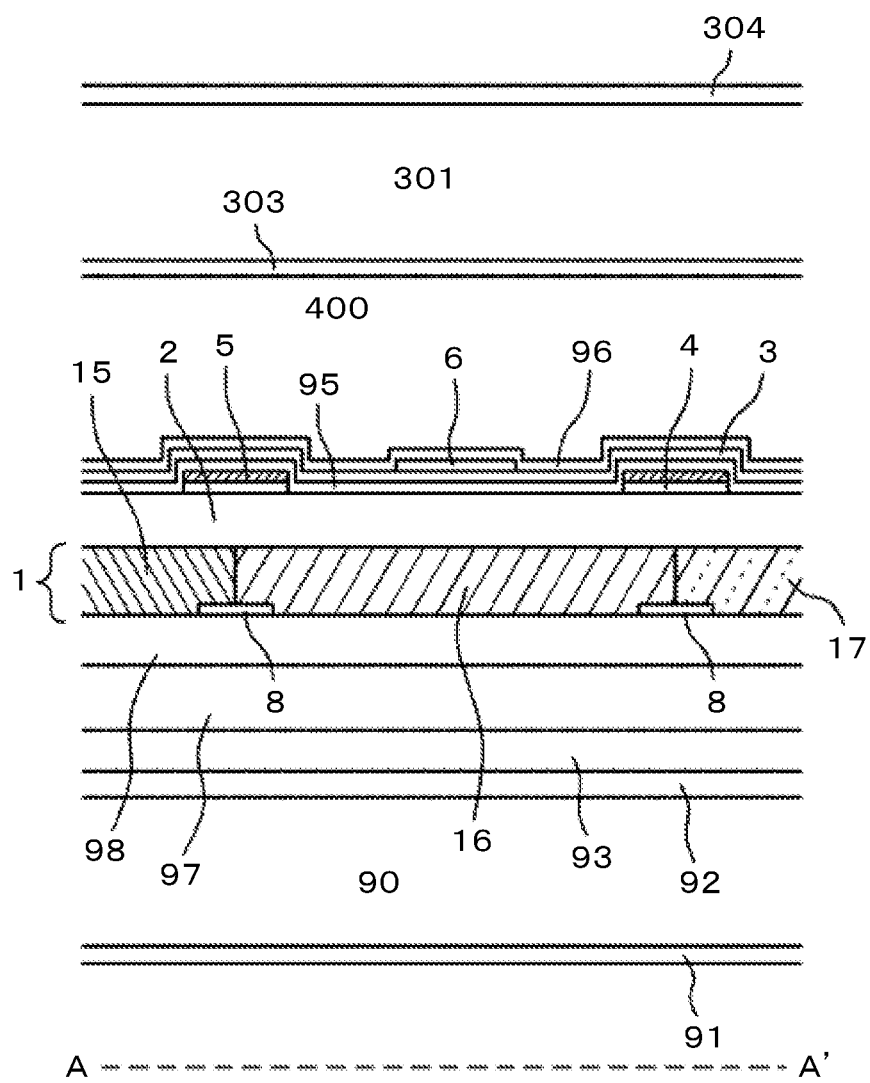
FIG. 12 is a cross sectional view of a liquid crystal display device according to a fourth embodiment.
Figure 13:
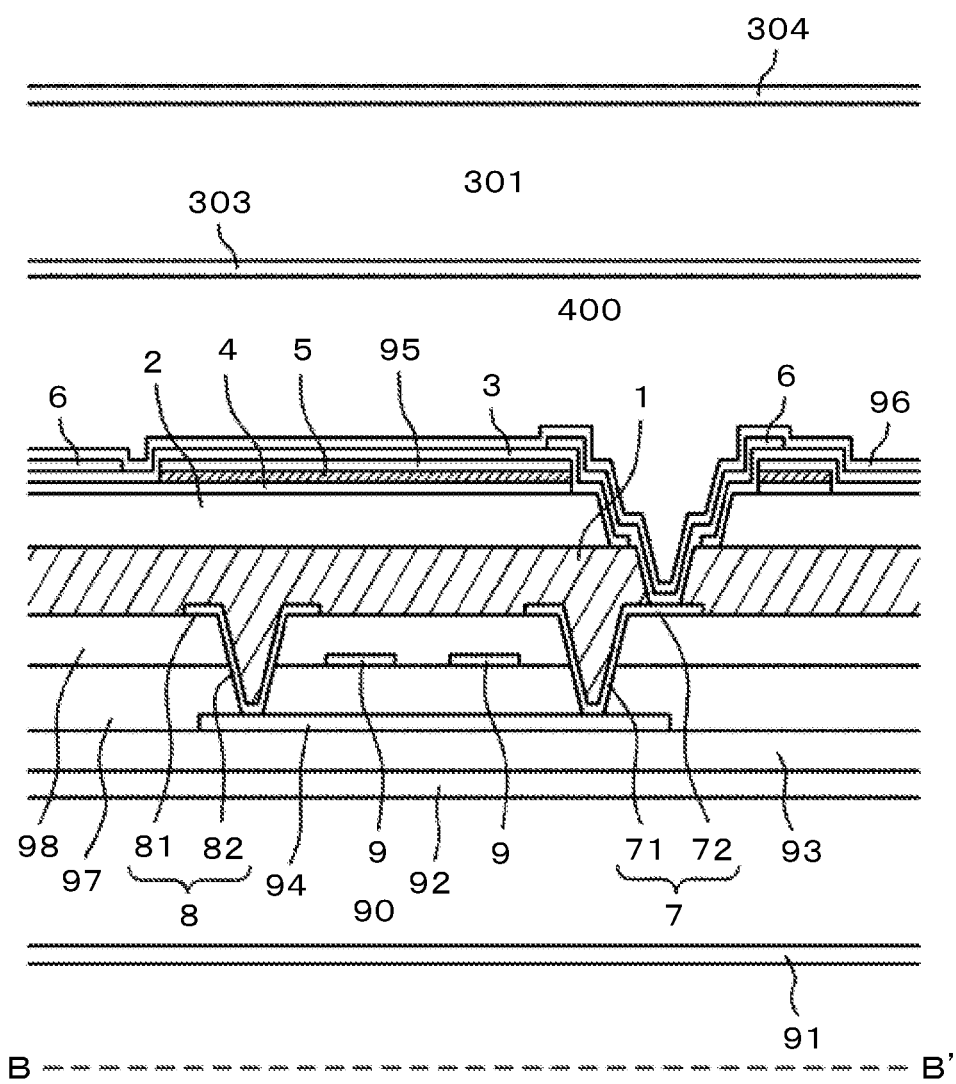
FIG. 13 is across sectional view of the liquid crystal display device according to the fourth embodiment.

FIG. 12 is a cross sectional view of a liquid crystal display device 100 according to the fourth embodiment. FIG. 13 is a cross sectional view of the liquid crystal display device 100 according to the fourth embodiment. In the embodiment, the reflection reduction film 5 is made of a conductive material. The reflection reduction film 5 is provided directly below the common electrode 95, and electrically connected to the common electrode 95.

The common interconnection 4 is provided below the reflection reduction film 5. The common interconnection 4 is electrically connected to the reflection reduction film 5. Therefore, the common electrode 95 is electrically connected to the common interconnection 4. In this case, for example, the common interconnection 4 is in the shape similar to the shape of the common interconnection 4 in the first embodiment in a planar view.

According to the embodiment, the common interconnection 4 is provided below the common electrode 95, and the common interconnection 4 is close to the picture signal line 8 and the scanning signal line 9. Thus, the common interconnection 4 can reduce reflected light caused by the picture signal line 8 and the scanning signal line 9 in a wide range.

Fifth Embodiment

A fifth embodiment will be described. In the embodiment, the width of the common interconnection 4 is narrower than the width of the reflection reduction film 5.

Figure 14:
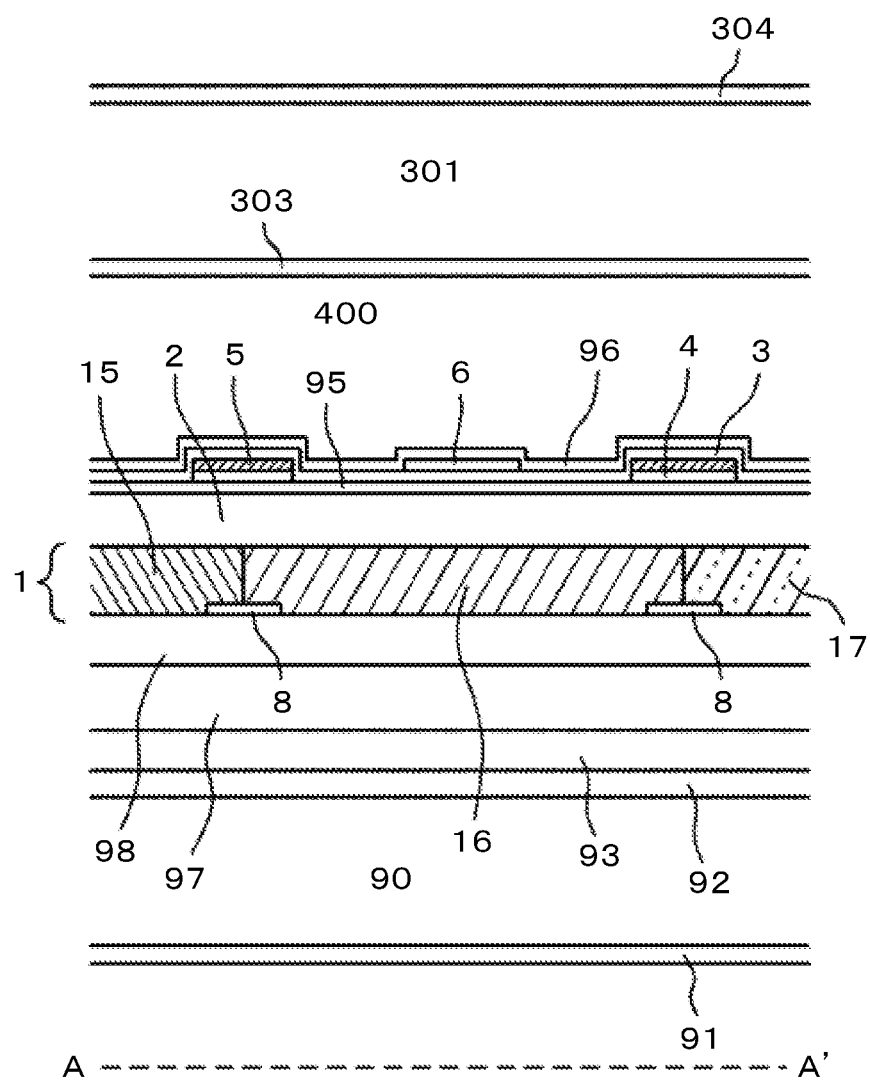
FIG. 14 is a cross sectional view of a liquid crystal display device according to a fifth embodiment.
Figure 15:
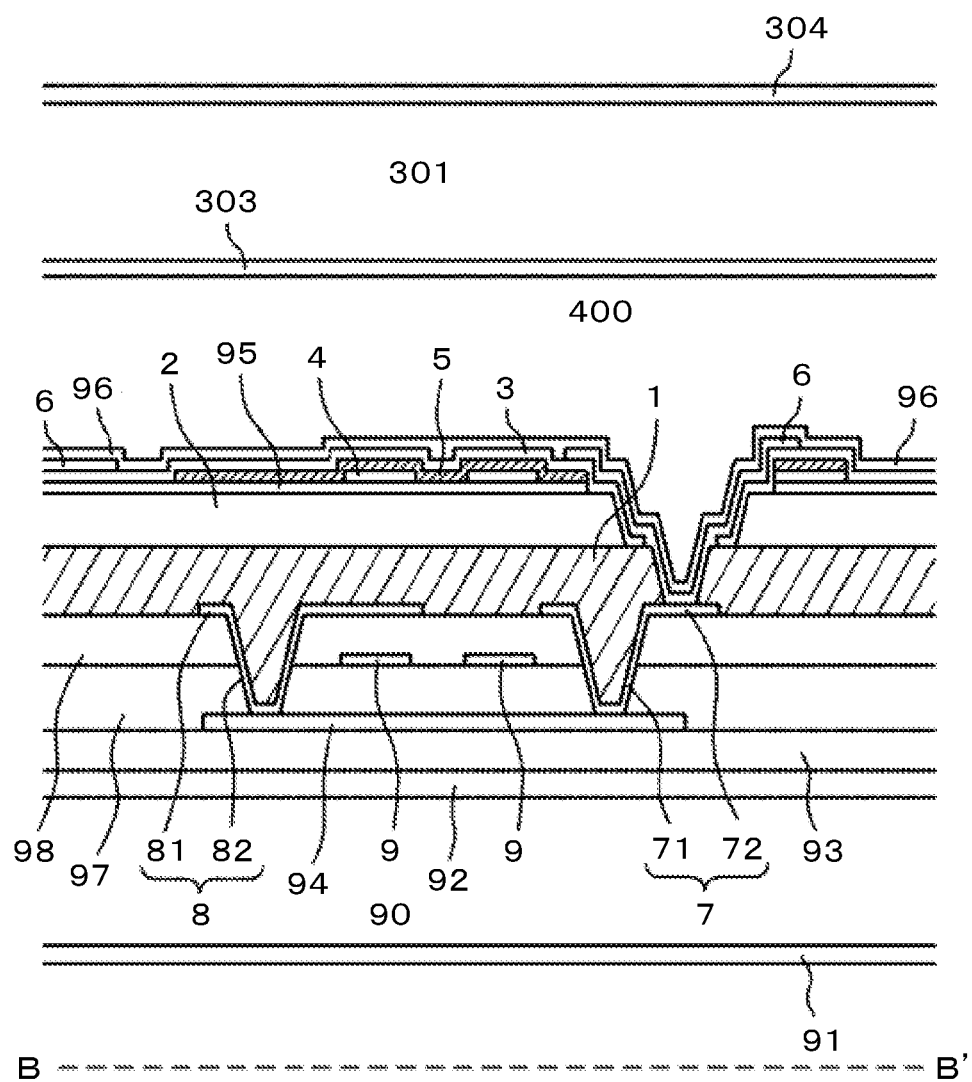
FIG. 15 is across sectional view of the liquid crystal display device according to the fifth embodiment
Figure 16:
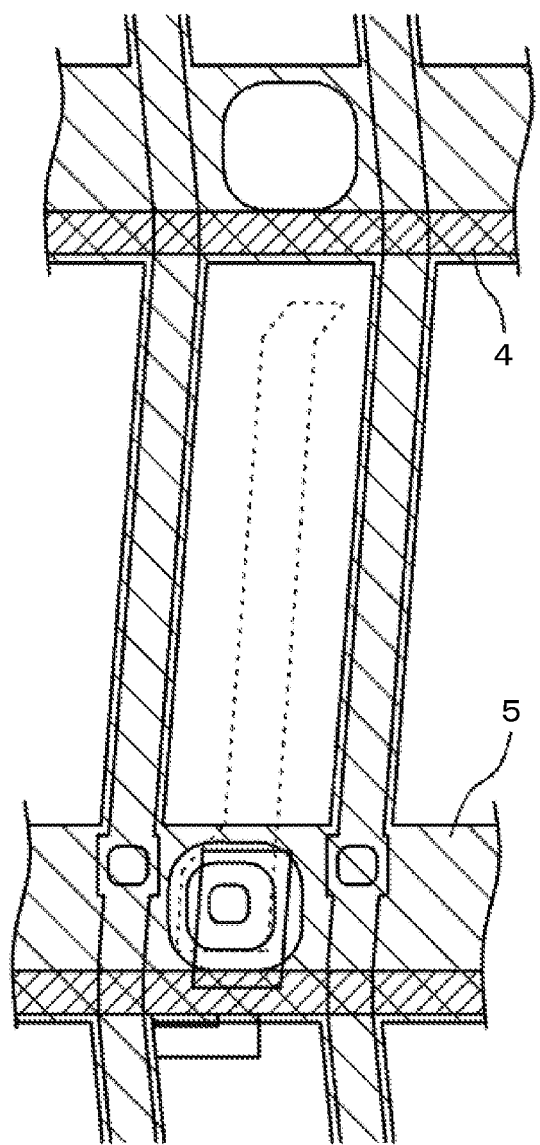
FIG. 16 is a plan view of an active device substrate according to the fifth embodiment.

FIG. 14 is a cross sectional view of a liquid crystal display device 100 according to the fifth embodiment, corresponding to FIG. 3. FIG. 15 is a cross sectional view of the liquid crystal display device 100 according to the fifth embodiment, corresponding to FIG. 4. FIG. 16 is a plan view of an active device substrate 200 according to the fifth embodiment, schematically illustrating the common interconnection 4 and the reflection reduction film 5.

The common interconnection 4 along the scanning signal line 9 has the same width as the width of the scanning signal line 9. In a planar view, the common interconnection 4 is provided at a location laid on the scanning signal line 9. The width of the common interconnection 4 along the scanning signal line 9 may be slightly wider than the width of the scanning signal line 9.

According to the embodiment, the width of the common interconnection 4 is narrower than the width of the reflection reduction film 5. Thus, the liquid crystal display device 100 can be reduced in the thickness and weight, and the reflected light of natural light reflected at the picture signal line 8 or the scanning signal line 9 can be reduced as well.

Sixth Embodiment

A sixth embodiment will be described. In the embodiment, the common interconnection 4 and the reflection reduction film 5 are collectively formed.

Figure 17A:
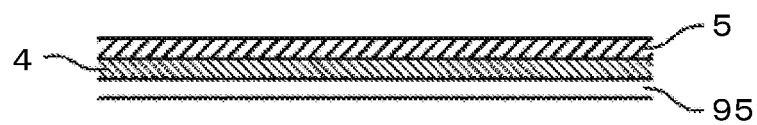
FIG. 17A is a diagram of a method of manufacture of a liquid crystal display device according to a sixth embodiment.
Figure 17A:
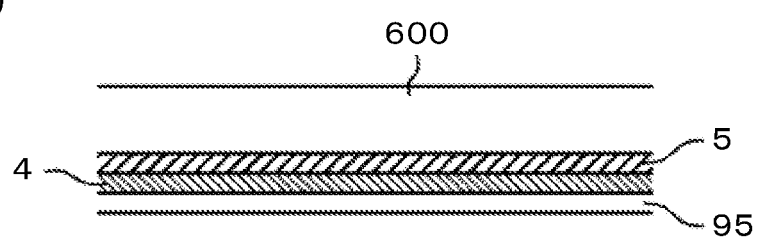
Figure 17A:
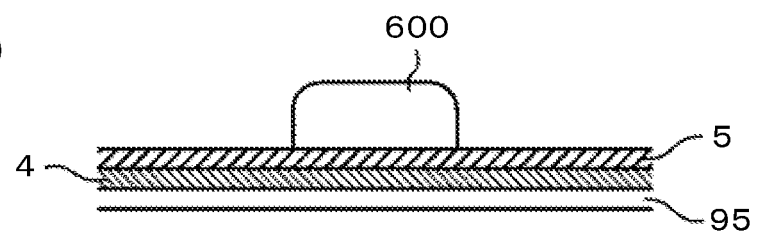
Figure 17B:
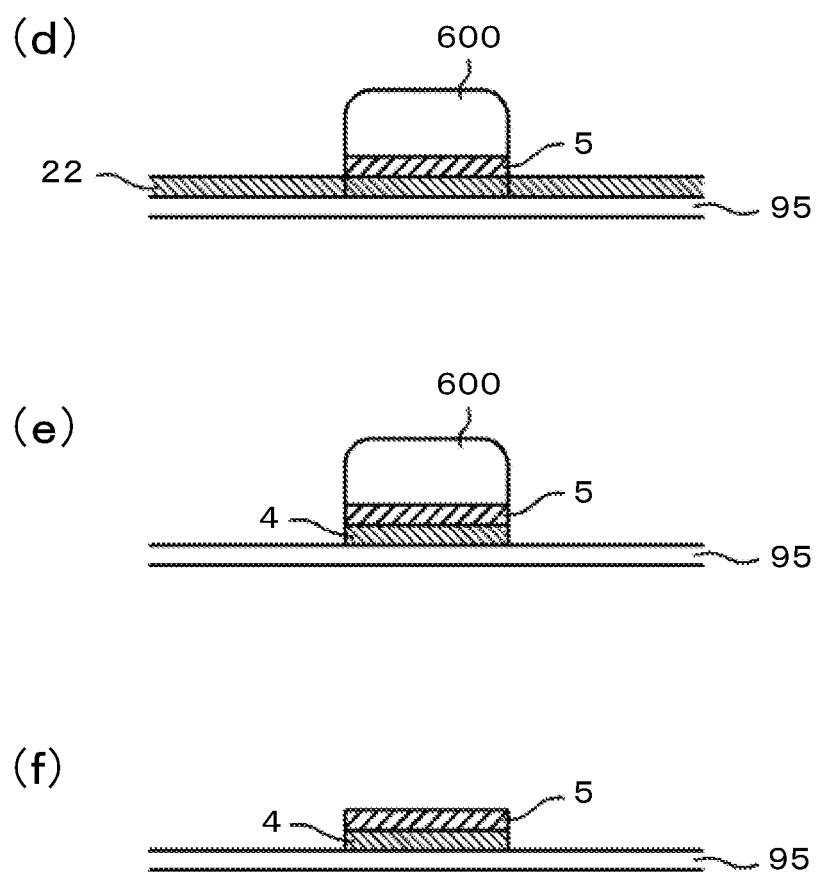
FIG. 17B is a diagram of a method of manufacture of the liquid crystal display device according to the sixth embodiment.

FIG. 17A is a diagram of a method of manufacture of a liquid crystal display device 100 according to the sixth embodiment. FIG. 17B is a diagram of a method of manufacture of the liquid crystal display device 100 according to the sixth embodiment. FIGS. 17A and 17B are diagrams of a method of manufacture of the common electrode 95, the common interconnection 4, and the reflection reduction film 5.

The manufacture method will be described. As illustrated in (a) in FIG. 17A, the common electrode 95, the common interconnection 4, and the reflection reduction film 5 are provided from below (S1).

As illustrated in (b) in FIG. 17A, a resist 600 is coated over the reflection reduction film 5 (S2). The resist 600 is coated by ink jet, for example. As illustrated in (c) in FIG. 17A, the resist 600 is developed (S3). Thus, the resist 600 has a desired shape.

As illustrated in (d) in FIG. 17B, the reflection reduction film 5 is etched along the shape of the resist 600 (S4). The reflection reduction film 5 is etched with an alkaline solution, for example. Thus, the reflection reduction film 5 has almost the same shape as the shape of the resist 600 in a planar view. As illustrated in (e) in FIG. 17B, the common interconnection 4 is etched along the shape of the resist 600 (S5). The common interconnection 4 is etched with an acidic solution, for example. Thus, the common interconnection 4 has almost the same shape as the shapes of the resist 600 and the reflection reduction film 5 in a planar view. As illustrated in (f) in FIG. 17B, the resist 600 is finally removed from the upper part of the reflection reduction film 5 (S6).

According to the embodiment, the common interconnection 4 and the reflection reduction film 5 are collectively etched. Thus, the position displacement between the common interconnection 4 and the reflection reduction film 5 can be reduced.

Seventh Embodiment

A seventh embodiment will be described. In the embodiment, the common interconnection 4 is provided between the picture signal line 8 and the reflection reduction film 5.

Figure 18:
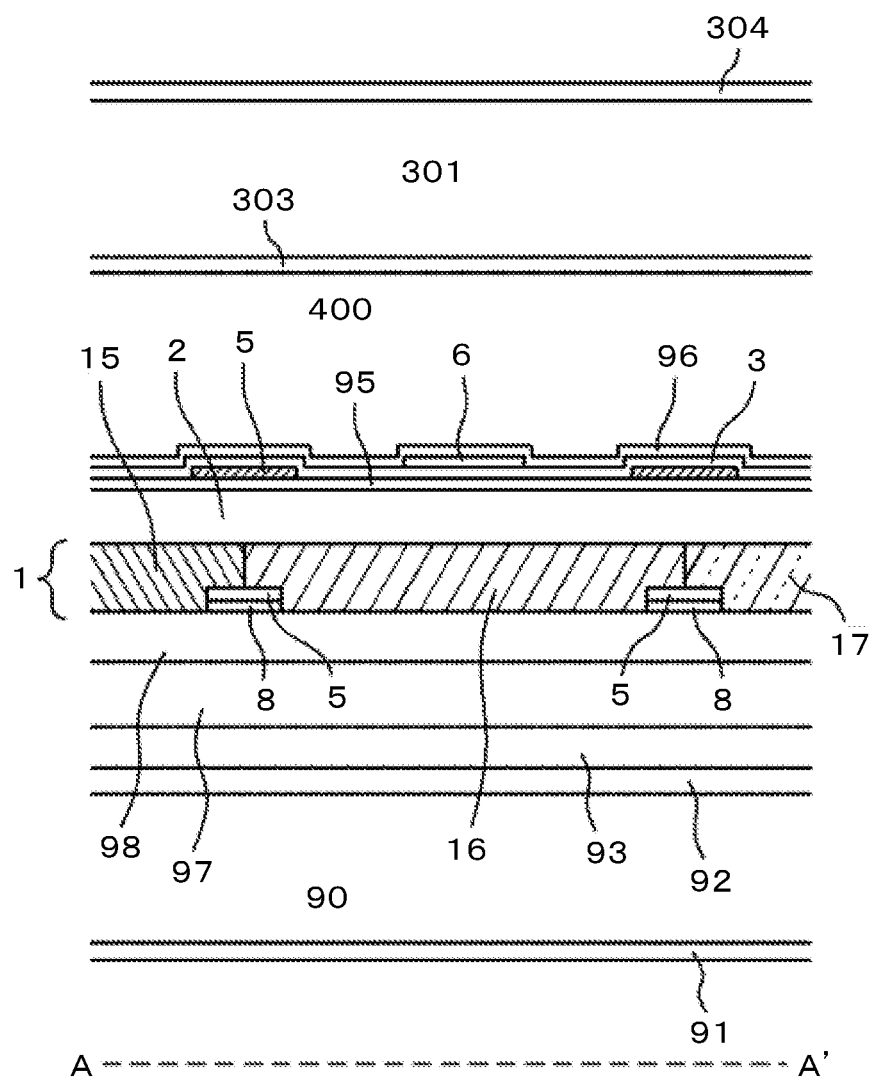
FIG. 18 is a cross sectional view of a liquid crystal display device according to a seventh embodiment.
Figure 19:
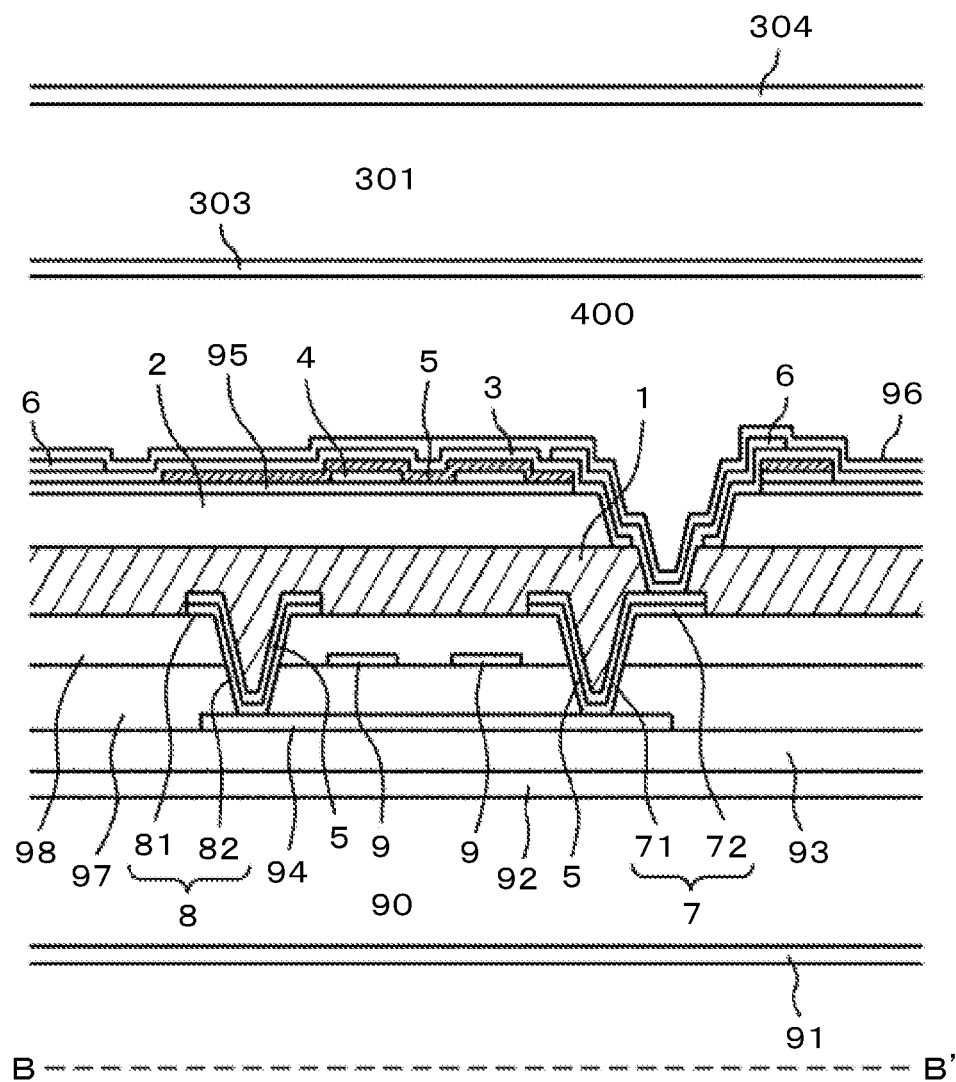
FIG. 19 is across sectional view of the liquid crystal display device according to the seventh embodiment.
Figure 20:
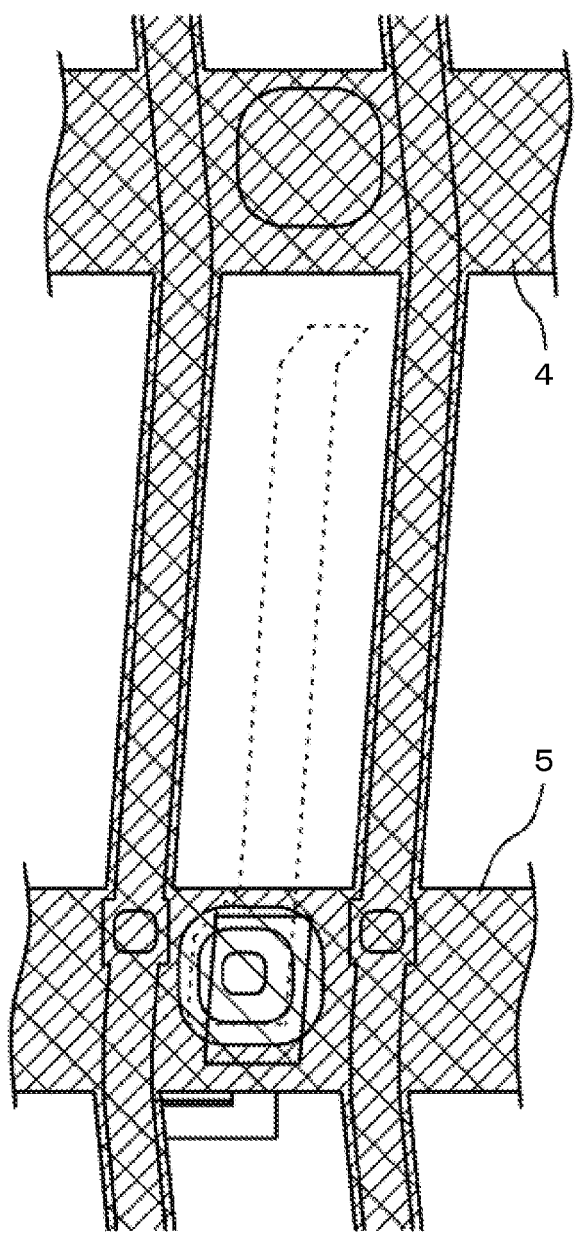
FIG. 20 is a plan view of an active device substrate according to the seventh embodiment.

FIG. 18 is a cross sectional view of a liquid crystal display device 100 according to the seventh embodiment, corresponding to FIG. 3. FIG. 19 is a cross sectional view of the liquid crystal display device 100 according to the seventh embodiment, corresponding to FIG. 4. FIG. 20 is a plan view of an active device substrate 200 according to the seventh embodiment, schematically illustrating the common interconnection 4 and the reflection reduction film 5.

The common interconnection 4 includes a strip portion 41 and a projecting portion 42. The common interconnection 4 is provided directly on the picture signal line 8. In other words, the strip portion 41 is provided directly on the line portion 81, and the projecting portion 42 is provided directly on the projecting portion 82. The common interconnection 4 may be provided directly on the relay electrode 7. In this case, the projecting portion 62 of the pixel electrode 6 is physically in contact with the relay electrode 7 through the projecting portion 42, and thus electrically connected to the relay electrode 7.

The width of the picture signal line 8 and the width of the common interconnection 4 are narrower than the width of the reflection reduction film 5. Thus, the reflected light of natural light, which is entered at various angles and reflected at the picture signal line 8 or the scanning signal line 9, can be reduced.

The common interconnection 4 only has to be provided between the picture signal line 8 and the reflection reduction film 5. The common interconnection 4 can be provided at any locations as well as the location directly on the picture signal line 8. For example, the common interconnection 4 may be provided on the second insulating layer 2.

Eighth Embodiment

An eighth embodiment will be described. In the embodiment, the reflection reduction film 5 is provided on the projecting portion 62 of the pixel electrode 6.

Figure 21:
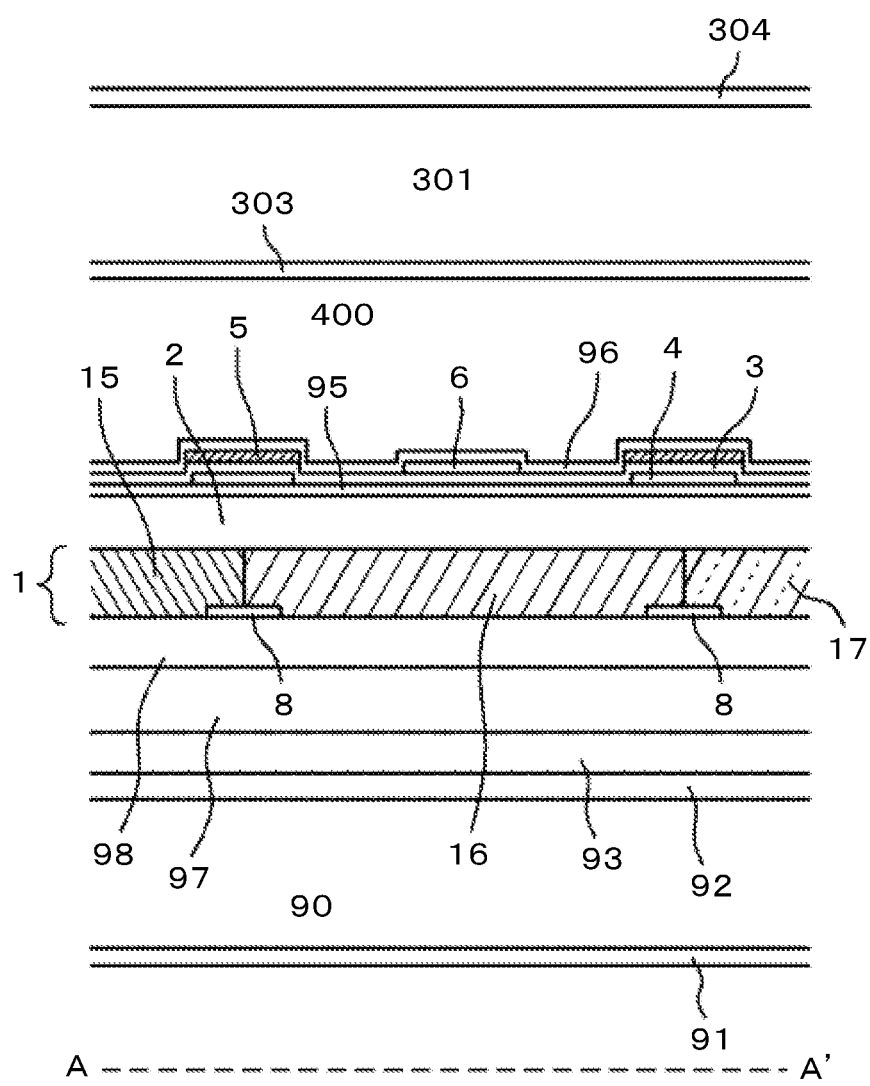
FIG. 21 is a cross sectional view of a liquid crystal display device according to an eighth embodiment.
Figure 22:
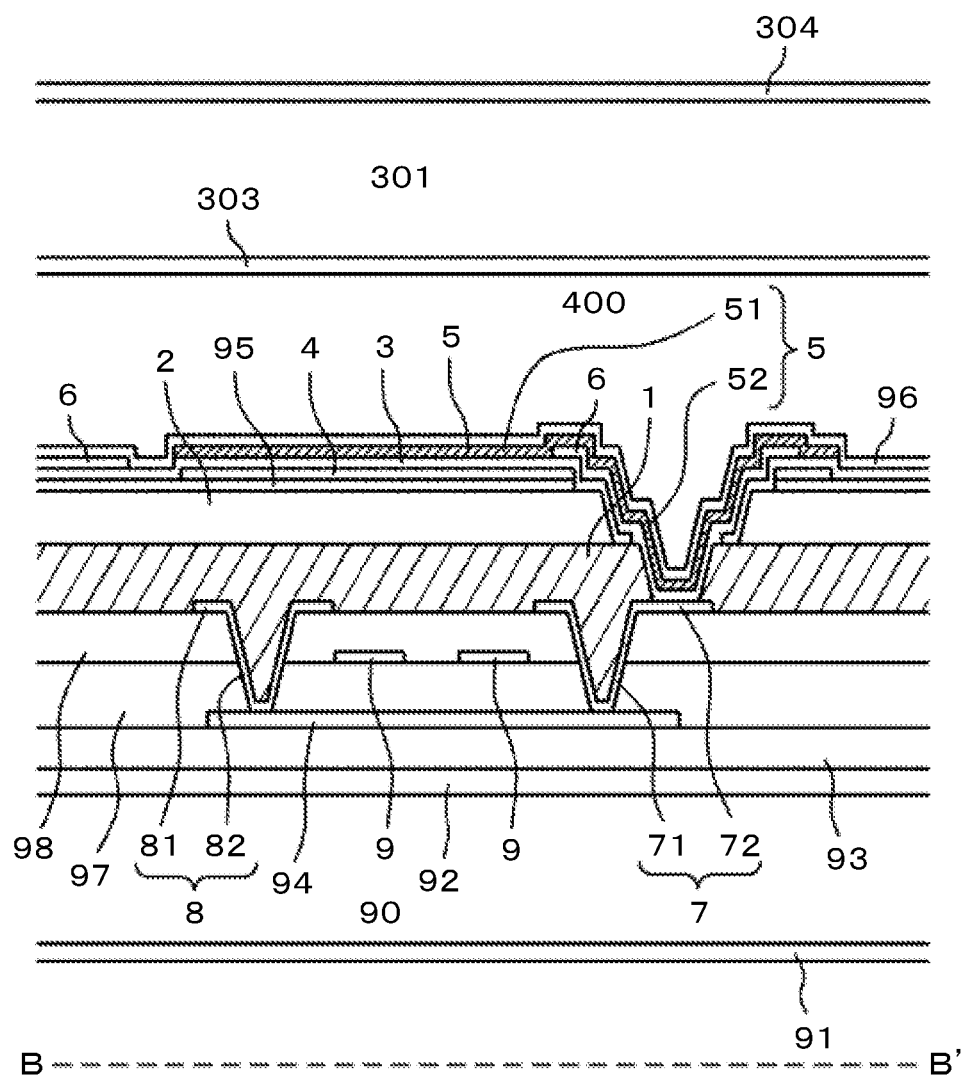
FIG. 22 is a cross sectional view of the liquid crystal display device according to the eighth embodiment.

FIG. 21 is a cross sectional view of a liquid crystal display device 100 according to the eighth embodiment. FIG. 22 is a cross sectional view of the liquid crystal display device 100 according to the eighth embodiment.

The common interconnection 4 is provided on the common electrode 95. The first insulating layer 3 is provided on the common interconnection 4 and on the common electrode 95 where the common interconnection 4 is not provided.

The reflection reduction film 5 includes a flat portion 51 and a projecting portion 52. The flat portion 51 is provided on the flat portion 31 of the first insulating layer 3. The projecting portion 52 is provided continuously to the flat portion 51, and protrudes along the projecting portion 62 of the pixel electrode 6. Therefore, the projecting portion 52 is provided on the inner side of the projecting portion 62.

According to the embodiment, the reflection reduction film 5 includes the projecting portion 52 on the projecting portion 62 of the pixel electrode 6. Thus, reflected light in the holes on the color filter 1 and the second insulating layer 2 and reflected light near these holes can be reduced. More specifically, the reflection reduction film 5 can reduce reflected light, which is reflected at the projecting portion 62 of the pixel electrode 6 and the relay electrode 7.

The projecting portion 22 of the second insulating layer 2 may be provided to the inside of the hole on the color filter 1 and in contact with the relay electrode 7.

The projecting portion 52 of the reflection reduction film 5 may be provided only on a part of the projecting portion 62. For example, the projecting portion 52 may be provided only inside the hole on the second insulating layer 2.

Ninth Embodiment

A ninth embodiment will be described. In the embodiment, a third insulating layer 99 is provided.

Figure 23:
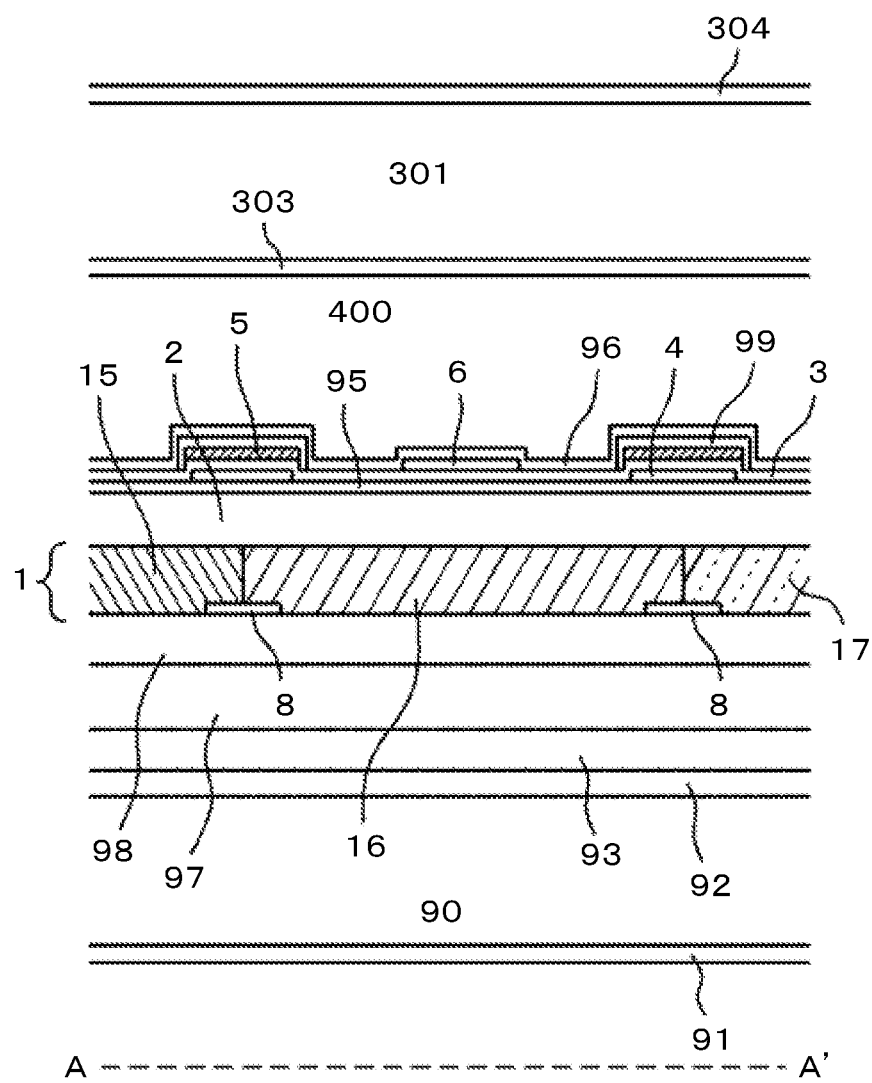
FIG. 23 is a cross sectional view of a liquid crystal display device according to a ninth embodiment.
Figure 24:
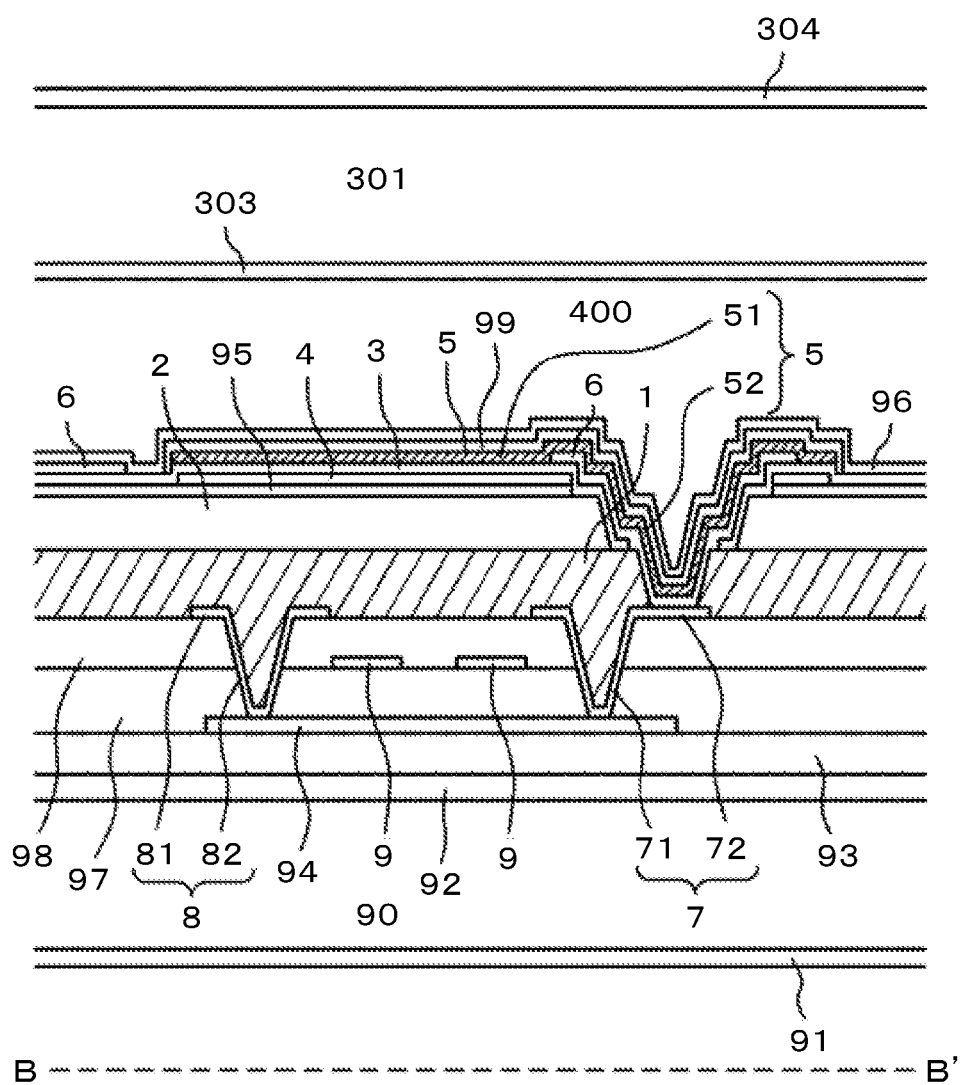
FIG. 24 is a cross sectional view of the liquid crystal display device according to the ninth embodiment.

FIG. 23 is a cross sectional view of a liquid crystal display device 100 according to the ninth embodiment. FIG. 24 is a cross sectional view of the liquid crystal display device 100 according to the ninth embodiment. The embodiment is different from the eighth embodiment in that the third insulating layer 99 is provided between the reflection reduction film 5 and the first alignment film 96.

The third insulating layer 99 is provided on the flat portion 51 and the projecting portion 52 of the reflection reduction film 5. The third insulating layer 99 may be provided only on any one of the flat portion 51 and the projecting portion 52. The alignment film 96 is provided on the third insulating layer 99, on the pixel electrode 6 where the third insulating layer 99 is not provided above, and on the first insulating layer 3 where neither the third insulating layer 99 nor the pixel electrode 6 is provided.

According to the embodiment, the third insulating layer 99 is provided between the reflection reduction film 5 and the first alignment film 96. Thus, impurities derived from the reflection reduction film 5 can be prevented from migrating to the liquid crystal layer.

Tenth Embodiment

In the foregoing embodiments, the pixel electrode 6 is provided on the layer above the common electrode 95. However, the common electrode 95 may be provided on the layer above the pixel electrode 6. In the case in which the common electrode 95 is in a strip in a planar view, for example, the pixel electrode 6 and the common electrode 95 may be provided on the same layer.

Instead of the color filter 1 in the foregoing embodiments, the second insulating layer 2 that is located at the same position in the same shape as the color filter 1 may be provided. In this case, instead of the second insulating layer 2, the color filter 1 that is located at the same position in the same shape as the second insulating layer 2 is provided.

The embodiments disclosed in the present specification are all examples, and do not have to be taken as limitations. The gist of the present invention resides in claims, not in the meaning described above, and includes all of modifications and alterations within the meaning equivalent to claims and within claims. Moreover, technical features described in the embodiments can be combined with one another, and the combination of the technical features can form novel technical features.

What is claimed is:

1. A liquid crystal display device comprising:
a first substrate, a liquid crystal layer provided on the first substrate, and a second substrate provided on the liquid crystal layer,
wherein the first substrate includes
a color filter,
a common electrode provided on the color filter,
a common interconnection electrically connected to the common electrode,
a reflection reduction film provided on the common interconnection and on the color filter,
a pixel electrode that produces an electric field across the common electrode and the pixel electrode,
a first insulating layer provided between the common electrode and the pixel electrode,
a second insulating layer is in contact with the color filter, and
wherein the common electrode is provided on the second insulating layer.

2. The liquid crystal display device according to claim 1, further comprising
a metal signal line provided below the common interconnection to carry a signal,
wherein the common interconnection is provided on the signal line and along the signal line in a planar view.

3. The liquid crystal display device according to claim 2, wherein the reflection reduction film is provided on the common electrode.

4. The liquid crystal display device according to claim 1, wherein: the signal is a picture signal;
the first substrate further comprises a semiconductor layer that carries a picture signal transmitted through the signal line and a relay electrode that carries a picture signal transmitted through the semiconductor layer;
a first hole is formed on the color filter, and a second hole is formed on the second insulating layer; and
the pixel electrode has a flat portion provided on the common electrode, the color filter, and the second insulating layer and a first projecting portion protruding inside the first hole and the second hole and electrically connected to the relay electrode.

5. The liquid crystal display device according to claim 4, wherein the reflection reduction film has a second projecting portion provided on the first projecting portion.

6. The liquid crystal display device according to claim 2, wherein: the reflection reduction film is made of a conductive material;
the reflection reduction film is provided below the common electrode; and
the common electrode is electrically connected to the common interconnection.

7. The liquid crystal display device according to claim 2, wherein the common interconnection is provided below the common electrode.

8. The liquid crystal display device according to claim 3, wherein the common interconnection is provided below the common electrode.

9. The liquid crystal display device according to claim 1, further comprising a third insulating layer provided on the reflection reduction film.

10. The liquid crystal display device according to claim 2, further comprising a third insulating layer provided on the reflection reduction film.

11. The liquid crystal display device according to claim 3, further comprising a third insulating layer provided on the reflection reduction film.

12. The liquid crystal display device according to claim 4, further comprising a third insulating layer provided on the reflection reduction film.

13. The liquid crystal display device according to claim 5, further comprising a third insulating layer provided on the reflection reduction film.

14. The liquid crystal display device according to claim 6, further comprising a third insulating layer provided on the reflection reduction film.

15. The liquid crystal display device according to claim 7, further comprising a third insulating layer provided on the reflection reduction film.

* * * * *